United States Patent
Hampel et al.

(10) Patent No.: US 10,482,275 B2
(45) Date of Patent: *Nov. 19, 2019

(54) IMPLEMENTING ACCESS CONTROL BY SYSTEM-ON-CHIP

(71) Applicant: Cryptography Research, Inc., Sunnyvale, CA (US)

(72) Inventors: Craig E. Hampel, Los Altos, CA (US); Jean-Michel Cioranesco, Paris (FR); Rodrigo Portella do Canto, Paris (FR); Guilherme Ozari de Almeida, Brétigny-sur-Orge (FR)

(73) Assignee: Cryptography Research, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/111,972

(22) PCT Filed: Jan. 27, 2015

(86) PCT No.: PCT/US2015/013095
§ 371 (c)(1),
(2) Date: Jul. 15, 2016

(87) PCT Pub. No.: WO2015/113046
PCT Pub. Date: Jul. 30, 2015

(65) Prior Publication Data
US 2016/0350549 A1 Dec. 1, 2016

Related U.S. Application Data

(60) Provisional application No. 62/045,942, filed on Sep. 4, 2014, provisional application No. 61/948,504, filed
(Continued)

(51) Int. Cl.
*G06F 21/62* (2013.01)
*G06F 21/44* (2013.01)
(Continued)

(52) U.S. Cl.
CPC .......... *G06F 21/6218* (2013.01); *G06F 21/44* (2013.01); *G06F 21/57* (2013.01);
(Continued)

(58) Field of Classification Search
CPC ...... G06F 21/6218; G06F 21/85; G06F 21/57; G06F 21/44; H04L 63/06; H04L 63/101;
(Continued)

(56) References Cited

U.S. PATENT DOCUMENTS 6,098,172 A * 8/2000 Coss .................. H04L 63/0254
726/11
7,539,304 B1 5/2009 Lyle
(Continued)

FOREIGN PATENT DOCUMENTS

CN 102811227 A 12/2012

OTHER PUBLICATIONS

Xiao Bo et al., Administration mechanism for standard way access control list (ACL) rule under Internet protocol security (IPsec) protocol, CN102811227 (A), Dec. 5, 2012, pp. 1-4 (Machine translation).*
(Continued)

*Primary Examiner* — Luu T Pham
*Assistant Examiner* — Canh Le
(74) *Attorney, Agent, or Firm* — Lowenstein Sandler LLP

(57) ABSTRACT

Systems and methods for implementing access control by systems-on-chip (SoCs). An example SoC may comprise: an access control unit comprising a secure memory for storing access control data, the access control unit to: receive a message comprising an access control data item; store the access control data item in the secure memory; perform at least one of: authenticating the message using a message digest function, or validating contents of the secure memory by comparing a stored reference value with a calculated
(Continued)

value of a message digest function of the contents of the secure memory; and control, in view of the access control data item, access by an initiator device to a target device.

19 Claims, 23 Drawing Sheets

Related U.S. Application Data on Mar. 5, 2014, provisional application No. 61/932,187, filed on Jan. 27, 2014.

(51) Int. Cl.
| | |
|---|---|
| *G06F 21/57* | (2013.01) |
| *G06F 21/85* | (2013.01) |
| *H04L 29/06* | (2006.01) |
| *G06F 21/75* | (2013.01) |

(52) U.S. Cl.
CPC .......... *G06F 21/755* (2017.08); *G06F 21/85* (2013.01); *H04L 63/0227* (2013.01); *H04L 63/06* (2013.01); *H04L 63/08* (2013.01); *H04L 63/0876* (2013.01); *H04L 63/101* (2013.01); *H04L 63/123* (2013.01)

(58) Field of Classification Search
CPC ... H04L 63/0876; H04L 63/08; H04L 63/123; H04L 63/0227
See application file for complete search history.

(56) References Cited

U.S. PATENT DOCUMENTS

| 9,623,481 | B2 | 4/2017 | Mizikovsky et al. |
|---|---|---|---|
| 2003/0126439 | A1 | 7/2003 | Wheeler et al. |
| 2003/0229900 | A1 | 12/2003 | Reisman |
| 2004/0059930 | A1* | 3/2004 | DiFalco ............... G06F 21/562 713/194 |
| 2004/0163013 | A1 | 8/2004 | Watt et al. |
| 2005/0010757 | A1 | 1/2005 | Bosler |
| 2006/0090084 | A1* | 4/2006 | Buer ...................... G06F 21/53 713/189 |
| 2006/0208066 | A1* | 9/2006 | Finn ..................... G06K 7/0004 235/380 |
| 2007/0033467 | A1 | 2/2007 | Bancel et al. |
| 2008/0130875 | A1 | 6/2008 | Ahlquist |
| 2008/0137853 | A1 | 6/2008 | Mizikovsky et al. |
| 2009/0089861 | A1 | 4/2009 | Catalano et al. |
| 2010/0023774 | A1* | 1/2010 | Matsuzaki ............ G06F 21/606 713/176 |
| 2010/0185804 | A1* | 7/2010 | Omizo ................ G06F 12/0246 711/103 |
| 2010/0217985 | A1* | 8/2010 | Fahrny .................... G06F 21/10 713/169 |
| 2012/0079261 | A1 | 3/2012 | Leclercq |
| 2012/0236871 | A1* | 9/2012 | Wallace ................. H04L 61/10 370/401 |
| 2013/0282951 | A1 | 10/2013 | Kuo et al. |
| 2014/0185793 | A1 | 7/2014 | Wolrich et al. |
| 2014/0189369 | A1 | 7/2014 | Wolrich et al. |
| 2015/0086019 | A1* | 3/2015 | Tamminen ............ H04L 9/0819 380/278 |
| 2016/0162694 | A1 | 6/2016 | Wolrich et al. |
| 2017/0147356 | A1* | 5/2017 | Kotary .................. G06F 21/575 |

OTHER PUBLICATIONS

Dominique Cansell et al., "System-on-chip design by proof-based refinement", 2009, pp. 217-237. (Year: 2009).*

Cheng-Hong Li et al., "Using Functional Independence Conditions to Optimized the Performance of Latency-Insensitive Systems," 2007, pp. 32-39. (Year: 2007).*

PCT International Preliminary Report on Patentability for PCT Application No. PCT/US2015/13095, dated Aug. 2, 2016, 8 pages.

PCT Notification Concerning Transmittal of International Preliminary Report on Patentability for PCT Application No. PCT/US2015/13095, dated Aug. 11, 2016, 1 page.

PCT Search Report and The Written Opinion of the International Searching Authority for PCT Application No. PCT/US15/13095, dated May 22, 2015, 10 pages.

Diguet et al., "NOC-Centric Security of Reconfigurable SoC," Proceedings of the 2007 IEEE First International Symposium on Networks-on-Chip (NOCS'07). 10 pages.

Lemay et al., "Network-on-Chip Firewall: Countering Defective and Malicious System-on-Chip Hardware,"White Paper, University of Illinois at Urbana-Champaign, Apr. 15, 2014, Downloadable from http://arxiv.org/abs/1404.3465, 33 pages.

* cited by examiner

IMPLEMENTING ACCESS CONTROL BY SYSTEM-ON-CHIP

RELATED APPLICATIONS

This application is the U.S. national stage under 35 U.S.C. § 371 of International Application Number PCT/US15/13095, filed Jan. 27, 2015, which claims the benefit of U.S. Provisional Application No. 61/932,187, filed Jan. 27, 2014 and claims the benefit of U.S. Provisional Application No. 61/948,504, filed Mar. 5, 2014 and claims the benefit of U.S. Provisional Application No. 62/045,942 filed on Sep. 4, 2014. The entire contents of the above-referenced applications are incorporated by reference herein.

TECHNICAL FIELD

The present disclosure is generally related to computer systems, and is more specifically related to implementing access control functionality by systems-on-chip (SoCs).

BACKGROUND

A system-on-chip (SoC) may include one or more processor cores and/or other initiator devices communicating via one or more shared interconnects to various target devices (e.g., memory, storage, and/or peripheral devices). The shared interconnect-based architecture is inherently prone to malicious attacks against the control mechanisms that manage access to target devices by initiator devices communicatively coupled to the shared interconnect.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
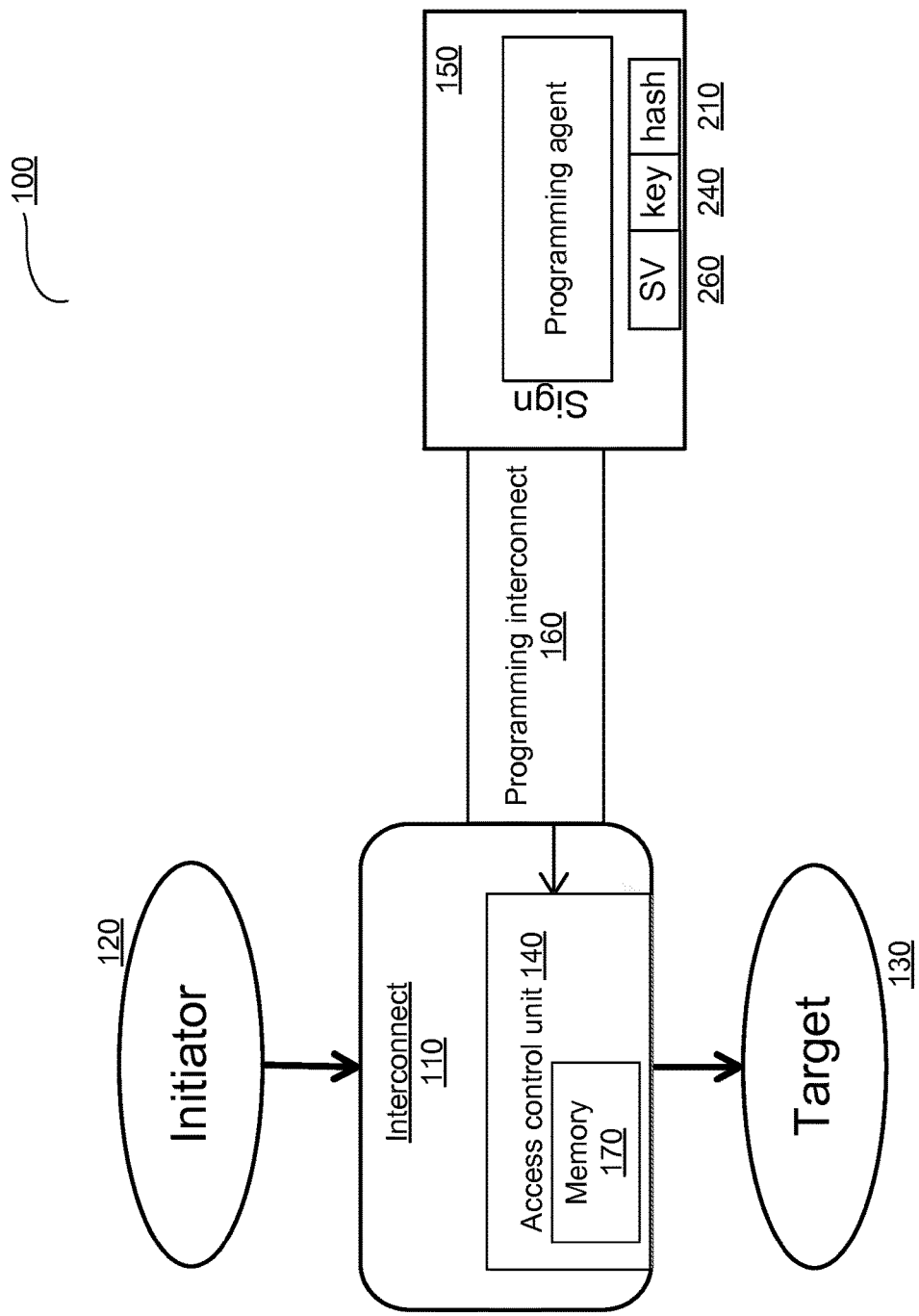
FIG. 1 schematically illustrates a functional block diagram of an example SoC operating in accordance with one or more aspects of the present disclosure.

Described herein are systems-on-chip (SoCs) implementing access control and methods for implementing and securing access control by SoCs. In particular, described are circuitry, software, and/or firmware for authenticating incoming messages comprising access control data and for validating and maintaining the integrity of the access control data stored by access control units.

A SoC may include one or more processor cores and/or other initiator devices communicating via one or more shared interconnects to various target devices (e.g., memory, storage, and/or peripheral devices). In certain implementations, a SoC may further comprise an access control unit (e.g., a firewall) that may be configured to control access to various target devices based on pre-defined and/or run-time programmable access control data (e.g., a set of access control rules). The access control unit may be programmed by an on-chip or an external programming agent that may transmit messages comprising access control data items (e.g., access control rules).

A programmable access control unit may become a target of various attacks involving malicious modifications of the access control data stored by the access control unit, replaying previously sent programming messages, fault injection or glitching by disrupting execution of one or more instructions by an external disturbance, and/or various other methods.

A SoC may be configured to authenticate incoming programming messages using a message digest function (e.g., a cryptographic hash function) that provides a digital signature to allow the hardware being reprogrammed to confirm the identity of the source of the programming sequence. A message digest function can be implemented by a non-invertible function that allows decrypting, using a first key of a key pair, a message that has been encrypted using a second key of the key pair. Examples of message digest functions include RSA cipher functions based on factorization of large prime numbers, cryptographic functions based on elliptic curves, and cryptographic hash functions. In certain implementations, a message digest function may be implemented by a cryptographic hash and one or more cryptographic keys shared between an authorized programming agent and a programmable hardware functional unit, as described in more details herein below.

In certain implementations, a SoC may be further configured to validate the integrity of the access control data stored by the access control unit by comparing a stored reference value with a value of a cryptographic hash function of the access control data calculated by the access control unit.

In various examples, initiator devices may be represented by on-chip or off-chip central processing units (CPUs), graphical processing units (GPU), cryptographic cores, etc. Target devices may be provided by on-chip or off-chip memory devices, storage devices, various input/output (I/O) devices, etc.

In certain implementations, the SoC may comprise a network-on-chip (NoC) and the access control unit may be provided by a filtering firewall configured to enforce the access control policy while transporting data frames and/or electric signals between various initiator and target devices. Alternatively, the access control unit may be implemented by a memory management unit (MMU) configured to enforce access control based on the access control data while translating addresses from one address space into another address space (e.g., virtual addresses to physical addresses).

The systems and methods described herein may be implemented by hardware (e.g., general purpose and/or specialized processing devices, and/or other devices and associated circuitry), software (e.g., instructions executable by a processing device), or a combination thereof. Various aspects of the methods and systems are described herein by way of examples, rather than by way of limitation.

FIG. 1 schematically illustrates a functional block diagram of an example SoC 100 operating in accordance with one or more aspects of the present disclosure. The example SoC 100 comprises an interconnect 110 to which one or more initiator devices 120 and one or more target devices 130 may be coupled. The interconnect 110 comprises an access control unit 140 configured to control access by the initiator devices to the target devices in order to allow or disallow access and sharing of various resources of the target devices by the initiator devices. The access control may be performed in view of programmable access control data that may be received from a programming agent 150 via a programming interconnect 160. The programming agent 150 may calculate a cryptographic hash 210 of a programming sequence to be transmitted to the access control unit 140. The cryptographic hash 210 may be calculated using a certain cryptographic hash function of a state variable 260 and a cryptographic key 240 that may be shared with the access control unit 140. The access control unit 140 may validate the received programming sequence by calculating the cryptographic hash of the programming sequence using the cryptographic hash function and the shared cryptographic key 240, as described in more details herein below with references to FIG. 3.

In various illustrative examples, the access control unit 140 may be coupled to the interconnect 110 on the initiator device or the target device side.

In the illustrative example of FIG. 1, the interconnect 110 is represented by a network-on-chip (NoC), and the access control unit 140 is represented by a firewall configured to enforce an access control policy while transporting data frames and/or electric signals between a plurality of initiator devices and a plurality of target devices. In another illustrative example, the access control unit may be implemented by a memory management unit (MMU) configured to enforce access control based on the access control data comprising one or more address translation rules, while translating virtual addresses to physical memory addresses on various target devices.

In various illustrative examples, one or more access control units 140 may be placed in various locations, including at the ingress of the interconnect 110, within the interconnect 110, or at the egress of the interconnect 110, as described in more details herein below with references to FIGS. 2A-2C. In various illustrative examples, each access control unit 140 may service one or more initiator devices and/or manage addresses targeted at one or more target devices.

Figure 2A:
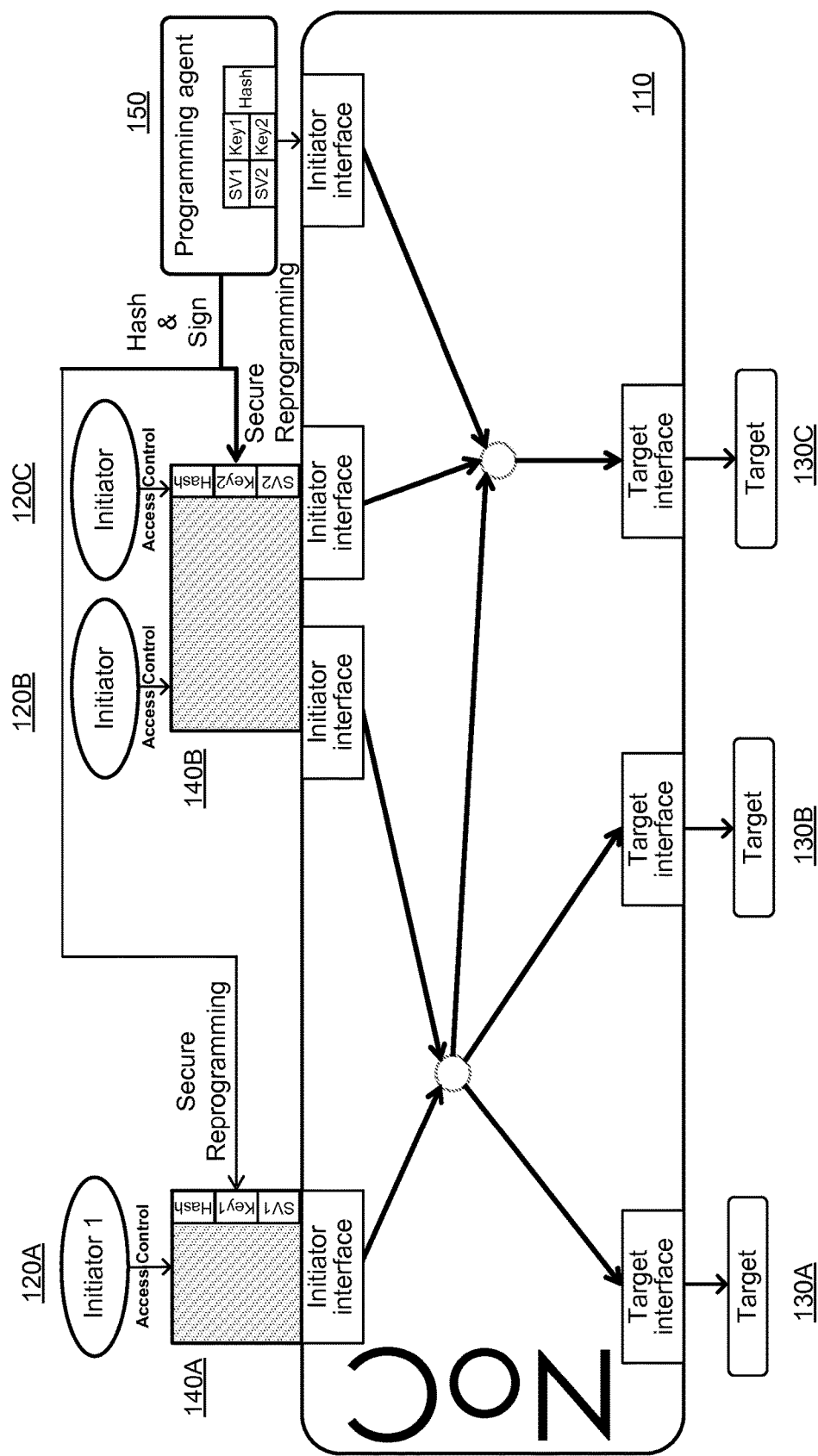
FIGS. 2A-2C schematically illustrate various locations of the access control unit within the SoC operating in accordance with one or more aspects of the present disclosure.

In certain implementations, the access control units 140A-140B may be placed near the initiator devices 120A-120C at the ingress of the interconnect 110, as schematically illustrated by FIG. 2A. Placing the access control units at the ingress of the interconnect allows the access control units to combine the access control and other address-related functions such as memory management (e.g., translating addresses from one address space into another address space and/or allowing the addresses on one side of the memory management unit appear contiguous while distributing the addresses through the memory space on the other side of the memory management unit).

Figure 2B:
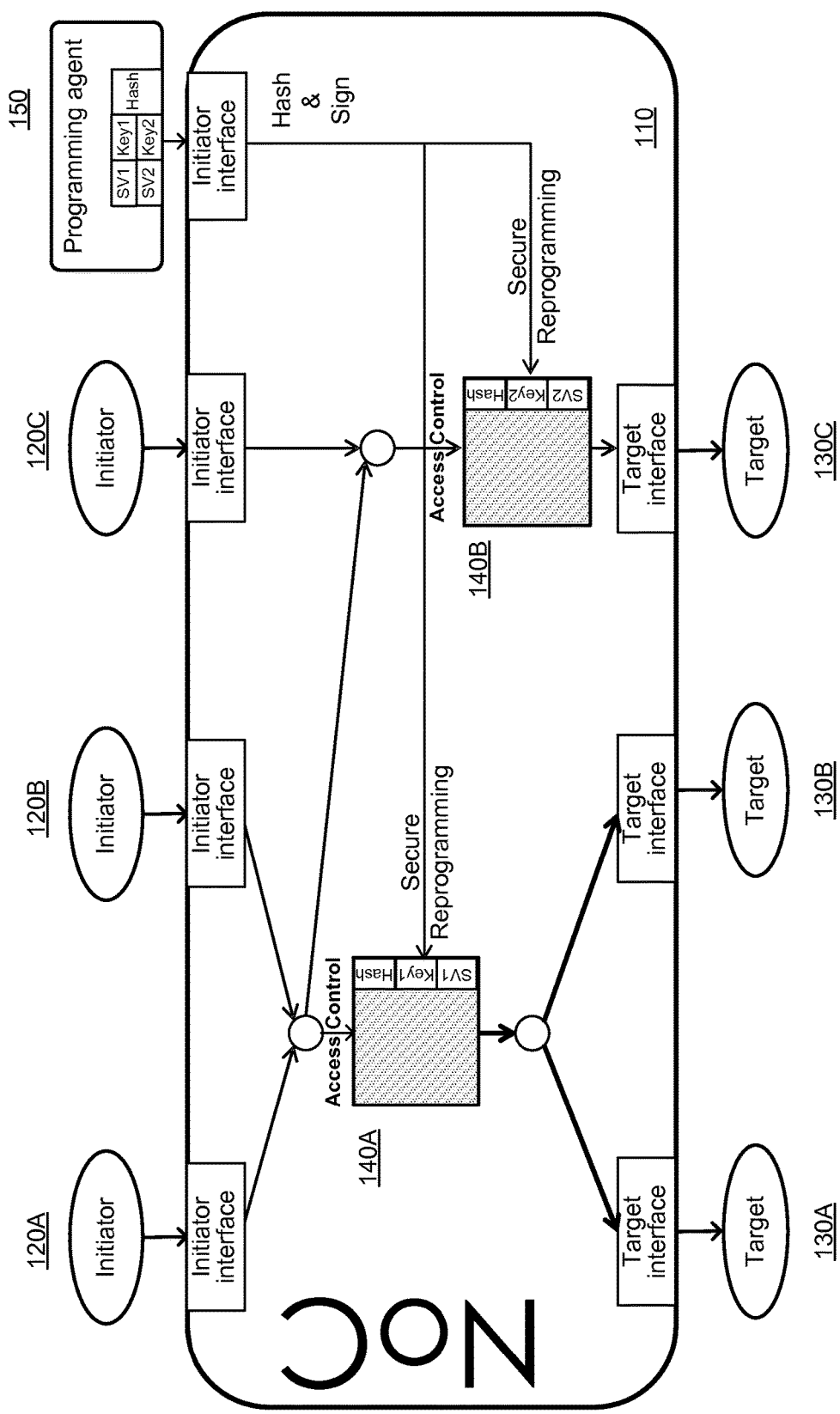

Alternatively, the access control units 140A-140B may be placed within the interconnect 110, so that access control may be enforced as the traffic is routed through the interconnect 110, as schematically illustrated by FIG. 2B. In the example of FIG. 2B, the access control units 140A-140B may enforce access control with respect to requests that are initiated by one or more initiators 120A-120C and routed through the interconnect 110, and/or manage addresses within the address spaces of one or more targets 130A-130C that are accessible through the interconnect 110.

Figure 2C:
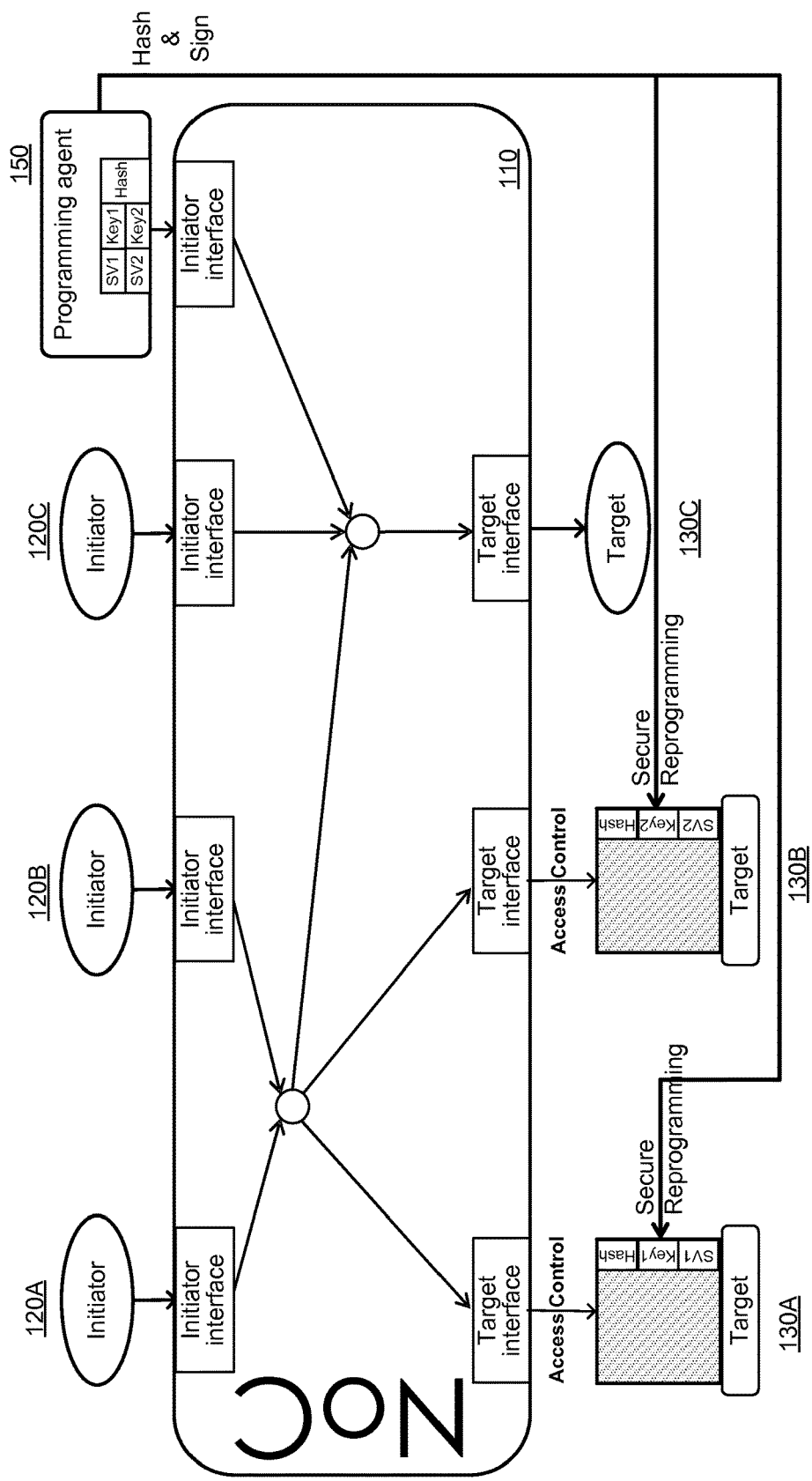

Alternatively, the access control units 140A-140B may be placed near the target 130A-130C at the egress of the interconnect 110, as schematically illustrated by FIG. 2C. In the example of FIG. 2C, the access control units 140A-140B may enforce access control for requests initiated by one or more initiators 120A-120C with respect to one or more targets that are accessible through the interconnect 110, and/or manage addresses within the address spaces of one or more targets 130A-130C that are accessible through the interconnect 110.

In certain implementations, the above described topologies may be combined so that various paths between certain initiator 120 and target 130 devices are managed by a one or more access control units 140 that are located at the ingress of the interconnect 110, within the interconnect 110, and/or at the egress of the interconnect 110.

The access control policy that is implemented by one or more access control units 140 may comprise a plurality of access control rules. In certain implementations, an access control rule may comprise an identifier of the initiator device, an identifier of the target device, a target device address range, access permissions, and/or an access authorization type. An access control rule may further comprise the required security state or level of secure execution required by an initiator to authorize the requested access. The access control policy may further indicate that certain rules are modified when the system is in a debug or higher privilege mode.

In various illustrative examples, identifiers of the initiator and target devices may be represented by a network address or by an identifier from an arbitrarily selected name space. In certain implementations, a device (initiator or target) identifier may identify two or more devices. The target device address range may be represented by a starting address, a block size, and/or a range selector for specifying non-contiguous ranges, as described in more details herein below. The access permissions may be specified by a set of flags designating read, write, required security level and/or execute permissions. The access authorization type may specify whether the rule "allows" or "denies" access by the initiator(s) to the target(s).

The access control unit 140 may receive from the programming agent 150, via a programming interconnect 160, a programming sequence comprising one or more access control data items (e.g., one or more access control rules). In various illustrative examples, the programming agent 150 may be represented by an on-chip or off-chip agent communicatively coupled to the access control unit 140. The access control unit 140 may comprise a secure memory 170 for storing the access control data (e.g., a set of access control rules).

In accordance with one or more aspects of the present disclosure, the access control unit 140 and the programming agent 150 may share a cryptographic key that may be used for authentication of programming sequences transmitted by the programming agent 150. The cryptographic key may be obtained by the access control unit 140 and the programming agent 150 from an on-chip or off-chip key management system (KMS) (not shown in FIG. 1). In certain implementations, the cryptographic key may be valid for a single use, a single session, or a certain period of time, upon expiration of which a new cryptographic key will need to be generated.

Figure 3:
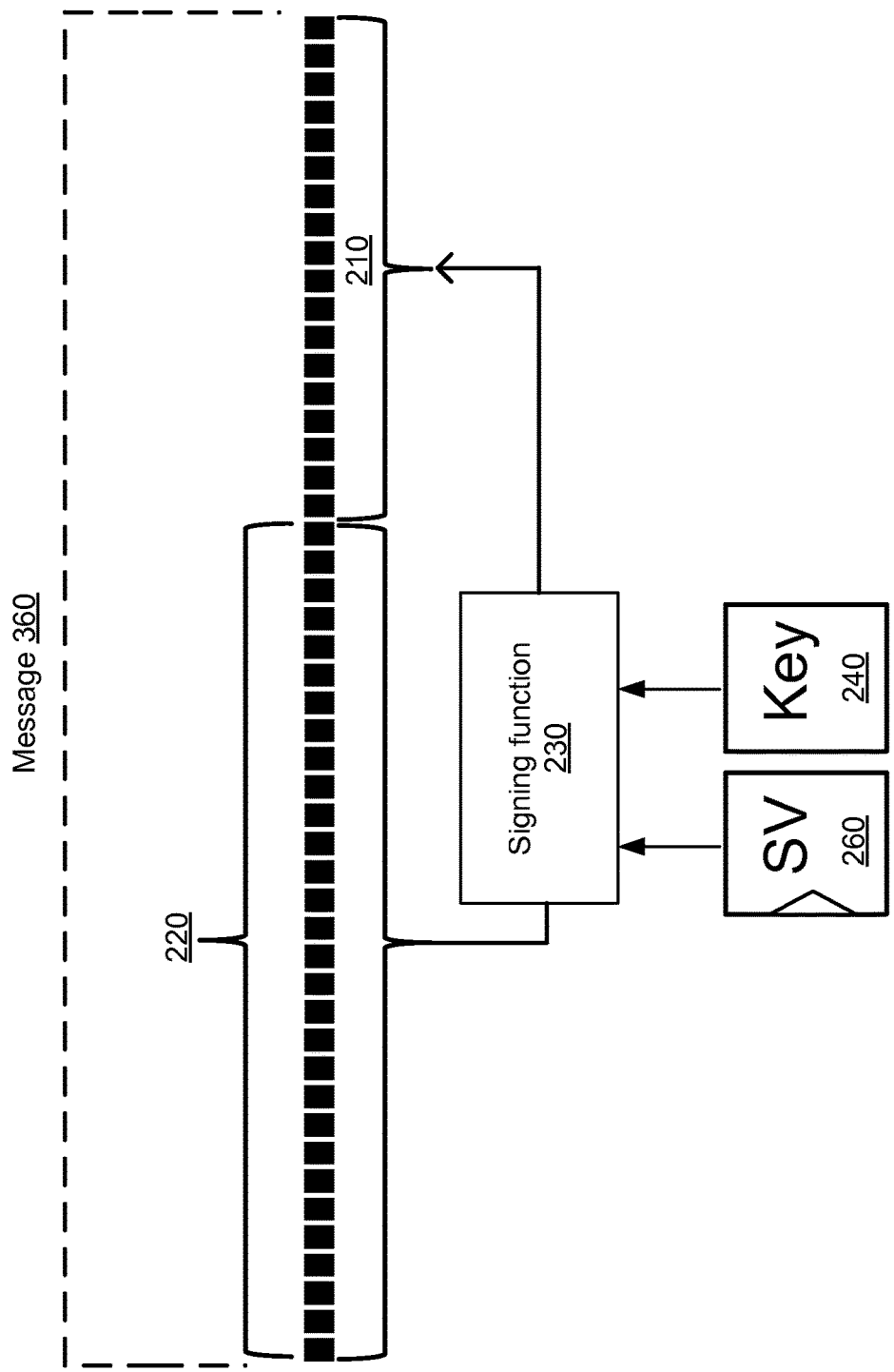
FIG. 3 schematically illustrates a programming sequence transmitted to an access control unit by a reprogramming agent, in accordance with one or more aspects of the present disclosure.

As schematically illustrated by FIG. 3, the programming agent may calculate a cryptographic hash 210 of a programming sequence 220 using a certain cryptographic hash function 230 of a state variable 260 and a cryptographic key 240 that may be shared with the access control unit 140. The programming agent 150 may then transmit to the access control unit 140 of FIG. 1, via the programming interconnect 160, a message 360 comprising the programming sequence 220 and the cryptographic hash 210. Responsive to receiving the message 360, the access control unit 140 may calculate the cryptographic hash of the programming sequence 220 using the cryptographic hash function and the shared cryptographic key 240. Should the calculated cryptographic hash match the cryptographic hash 210 received with the programming sequence 220, the programming sequence may be used by the access control unit for updating the access control data stored in the secure memory 170. Otherwise, if the calculated cryptographic hash differs from the cryptographic hash 210 received with the programming sequence 220, a security or programming error may be signaled, and the programming sequence 220 may be discarded.

Figure 4A:
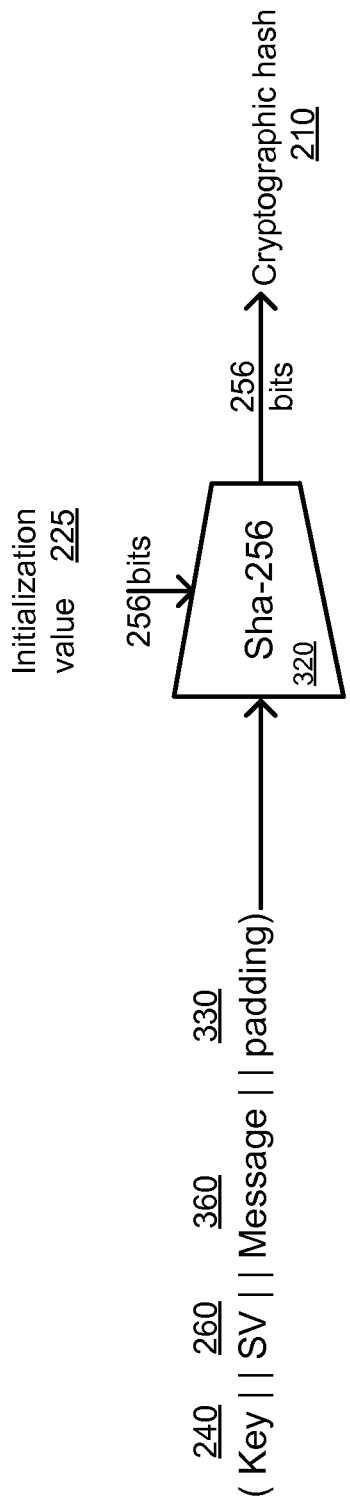
FIGS. 4A-4B schematically illustrate examples of calculating a cryptographic hash value of a programming sequence based on a cryptographic key and a state variable, in accordance with one or more aspects of the present disclosure.

The method of communication between the programming agent 150 and one or more access control units 140 may employ both static or limited use secrets (e.g., keys) as well as variable secrets (e.g., state variables) that change over time to prevent an attacker from using a previously transmitted sequence in an attempt to restore the access control unit to a previous state. In certain implementations, the cryptographic hash function 230 of FIG. 3 may be provided by a Secure Hash Algorithm (SHA) compliant function, as schematically illustrated by FIG. 4A. The cryptographic hash 210 may be represented by a message authentication code (MAC) produced by a SHA-compliant function 320 of a SHA initialization value 225 and a concatenation of a cryptographic key 240 (also referred to as the permanent key), a state variable 260, message 360, and padding bits 330.

The state variable 260 reflects the state of communications between the programming agent 150 and the access control unit 140 of FIG. 1. Calculating the cryptographic hash value of the programming sequence based on both the cryptographic key and the state variable may prevent replay attacks in which a malicious third party may intercept and then attempt to replay a message being transmitted by the programming agent to the access control unit. The state variable value may be synchronized by the programming agent and the access control unit at the beginning of each session (e.g., within the boot sequence of the SoC 100 of FIG. 1), and then may be independently updated (e.g., incremented) by each party based on the previous value and the actual state of the access control data stored by the access control unit. Employing a state variable allows the message recipient to detect a message replay attempt by determining that the state variable associated with the message has not been properly updated.

Figure 5:
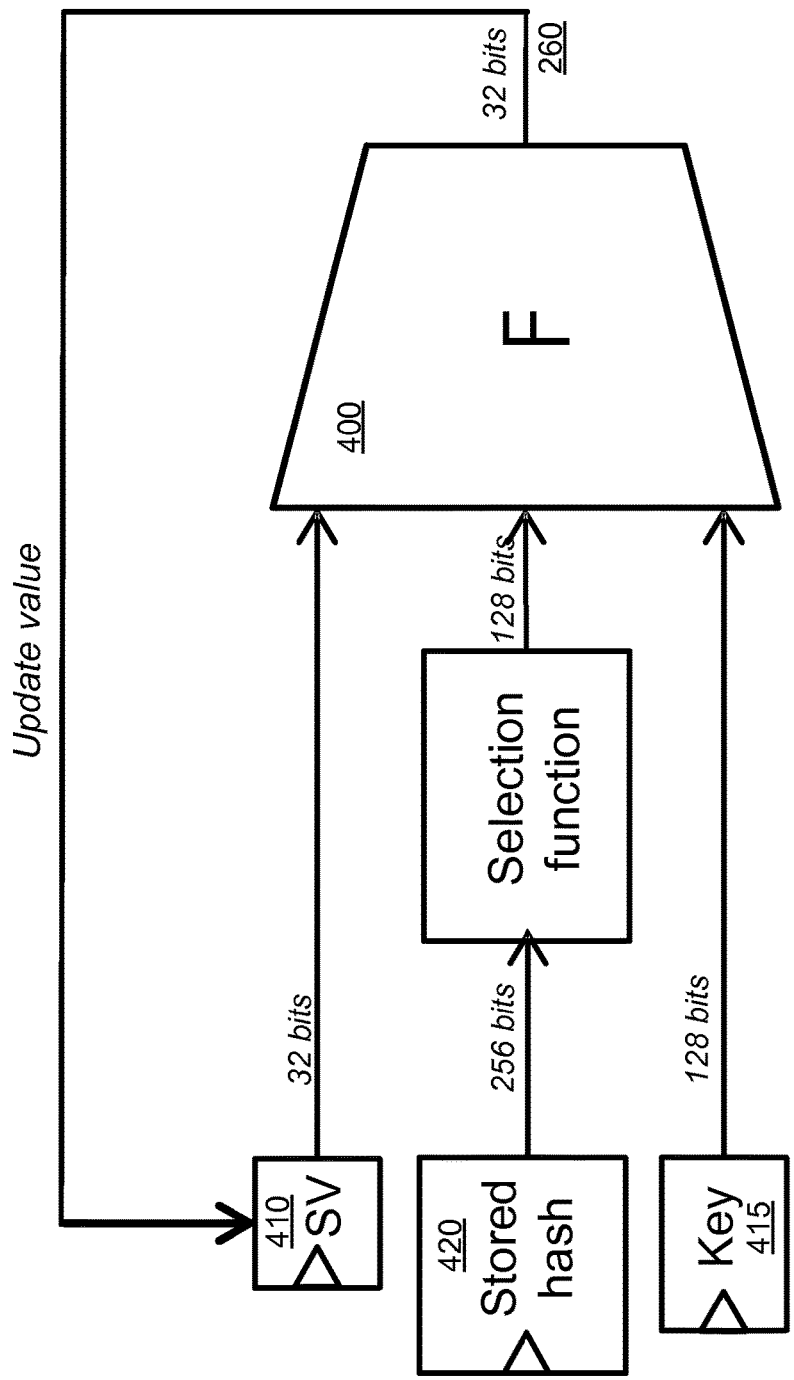
FIG. 5 schematically illustrates an example of defining a state variable that reflects the state of communications between a programming agent and an access control unit, in accordance with one or more aspects of the present disclosure.

In certain implementations, the state variable may be defined by a non-linear function of one or more parameters. In the illustrative example of FIG. 5, the state variable may be defined by applying a function 400 to the previous value 410 of the state variable, a cryptographic key 415, and a hash 420 of the contents of the secure memory storing the access control data. A selection function can be used to select a portion or reduction of the previous state to determine the contribution to the next state.

In the illustrative example of FIG. 4A, the message has a pre-defined size (e.g., 256 bits), and the concatenation of the cryptographic key 240, state variable 260, and the message 360 is padded to the pre-defined size by padding bits 330. For larger messages, the cryptographic function 320 may be applied to each of several parts of the original message, and then a resulting hash may be calculated based on those intermediate hash values.

Figure 4B:
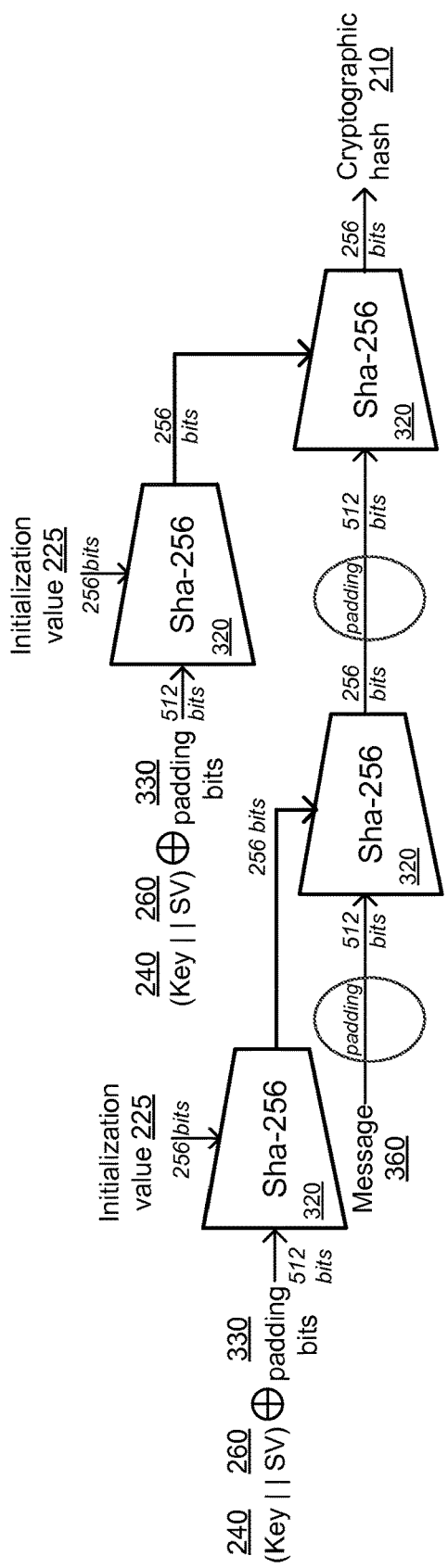

In certain implementations, the cryptographic hash 210 may be represented by a keyed-hash message authentication code (HMAC) produced by cascading the results of applying a SHA-compliant function 320 to the message 360, the cryptographic key 240, and the state variable 260, as schematically illustrated by FIG. 4B. The concatenation of the cryptographic key 240, the state variable 260, and the message 360 may be padded to the pre-defined size by padding bits 330. For larger messages, the SHA operation may be applied to each of several parts of the original message, and then a resulting hash may be calculated based on those intermediate hash values.

The same set of cryptographic keys may be used for all copies of a given system, or a unique set of keys may be used for each device and system. Cryptographic keys may be provisioned by a hardware-based and/or software-based key management system. In a hardware-based key management system, cryptographic keys associated with one or more access control units may be received from an on-die hardware module or derived from one or more keys received from the on-die hardware module. The software developer or system manufacturer may possess a cryptographic key associated with one or more access control units and utilize the key for transactions associated with those access control units. Alternatively, the hardware key management system may provide the cryptographic key to both the software providing the signature and the access control unit.

In a software-based key management system, a dedicated software function may create, store, or generate cryptographic keys and provide the keys to the access control unit to bind the software and hardware. The keys may be delivered through a dedicated key bus or through a register that is written once and then cannot be written again until it is reset, so that an attacker or rogue code would not be able to modify the cryptographic keys.

In an illustrative example, the cryptographic keys may be generated as random values and may be used for a single session following the system boot or for a certain period of time. This is often referred to as a "session key" since it used once for one session of operation and discarded on the next reboot or reset.

In certain implementations, the access control unit 140 of FIG. 1 may be further configured to perform an integrity check to validate and detect modification of the contents of the secure memory 170 storing the access control data (e.g., the firewall rule set), in an attempt to prevent fault injection attacks or glitching attacks implemented by disrupting execution of one or more instructions by an external disturbance or otherwise modifying the value stored in the secure memory 170 through an electrical, optical or other type of disturbance.

Figure 6A:
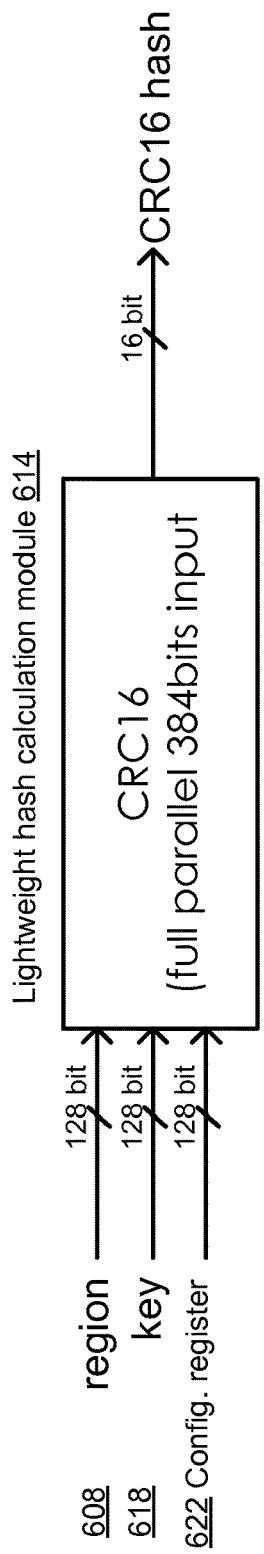
FIGS. 6A-6B schematically illustrate validating, by an access control unit, the contents of the secure memory storing the access control data, in accordance with one or more aspects of the present disclosure.

In an example illustrated by FIG. 6A, the integrity check may be performed by a lightweight hash calculation module 614 calculating a lightweight hash function (e.g., a cyclic redundancy check (CRC16)) of the contents of one or more regions 608 of the secure memory 170 using (in certain cases of the selected lightweight hash function) a cryptographic key 618 and, optionally, the contents of one or more configuration registers 622 of the access control unit 140 of FIG. 1. Using a lightweight hash function enables a full parallelization of the code so that one or more access control rules will be validated at each access.

Figure 6B:
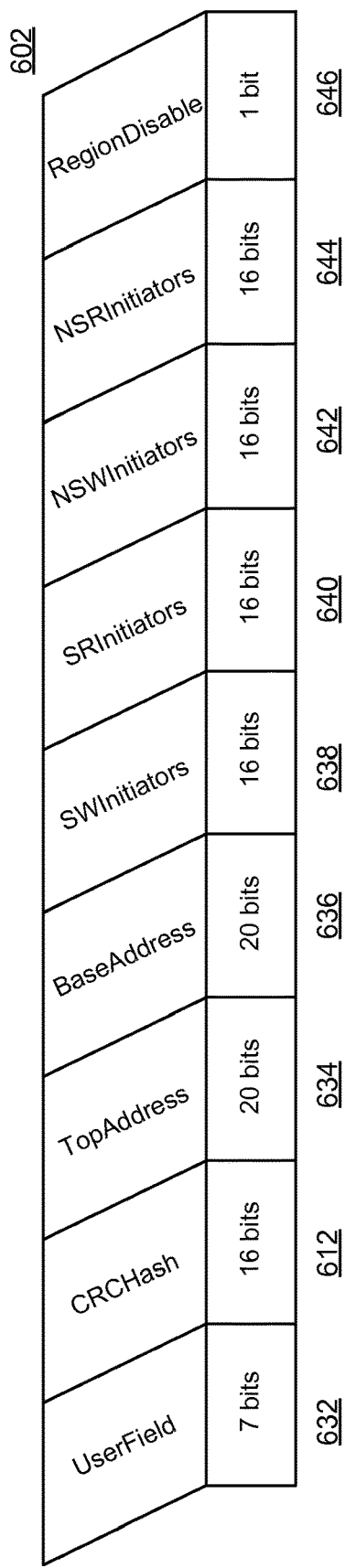

In an example illustrated by FIG. 6B, the secure memory 170 may store one or more access control data items (e.g., firewall rules) 602. Each access control data item 602 may comprise a 16-bit CRC hash 612 of fields 646, 644, 642, 640, 638, 636 and 634, to be used during the integrity check. Additional fields, such as filed 632, may be added to the hash, except for field 612 (otherwise a feedback loop would occur). Field 632 comprises reserved bits that may be used to store additional parameters relating to the memory region. Fields 636 and 634 represent the initial and final address that the memory region spans. Fields 644, 642,640 and 638 represent decoded access rights of 16 initiators, respectively: non-secure read, non-secure write, secure read and secure write: one bit per initiator asserting access rights. Field 646 deactivates the region when asserted to 1 and may in certain implementations be encoded on several bits to improve fault resistance.

Figure 7:
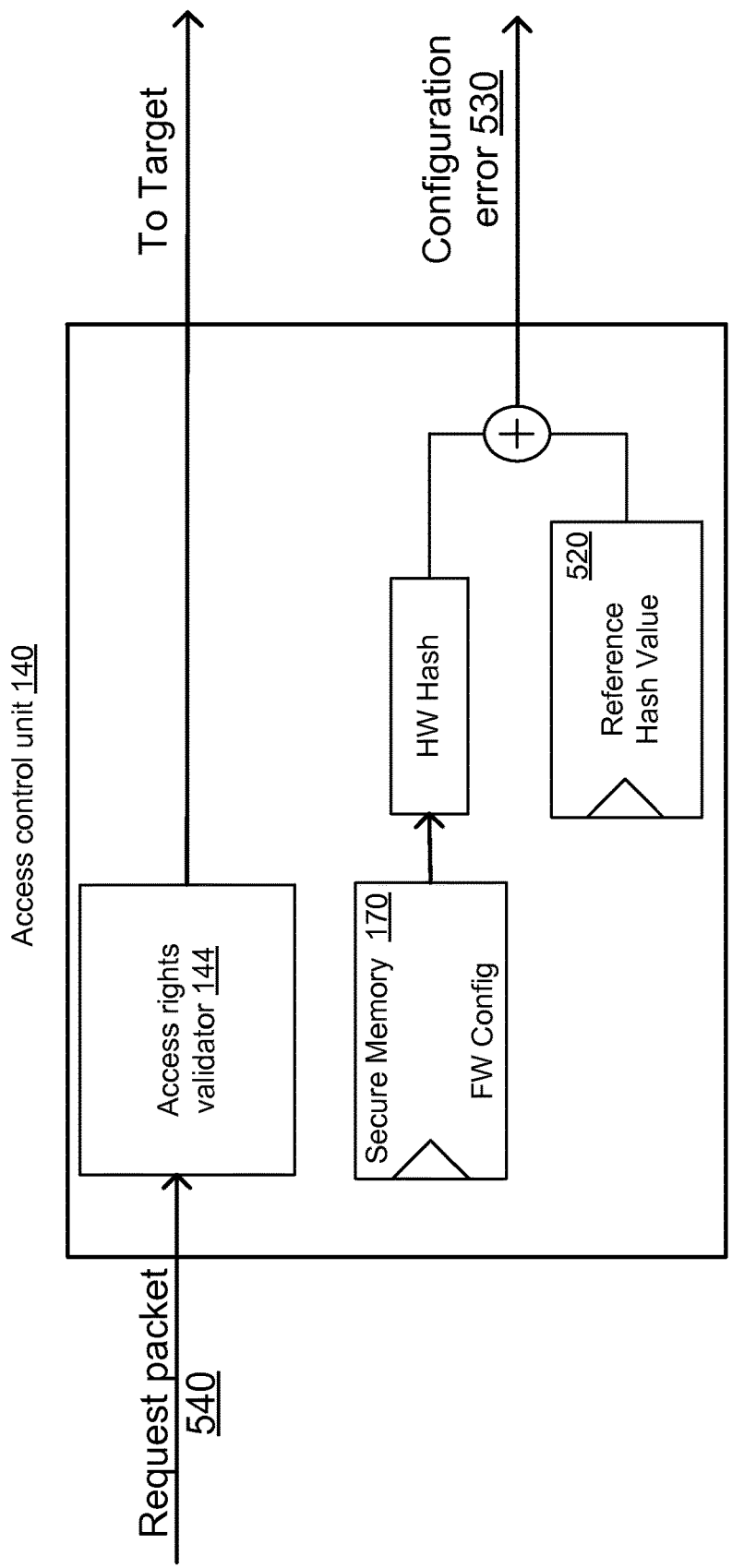
FIG. 7 schematically illustrates validating, by an access control unit, the contents of the secure memory storing the access control data, in accordance with one or more aspects of the present disclosure.

Responsive to receiving an access request 540 from an initiator device, the access control unit 140 may calculate a signing (e.g., a hash) value 510 of the contents of one or more regions of the secure memory 170 and compare the calculated cryptographic hash with a reference cryptographic hash 520 stored in a secure register or along with the secure memory region, as schematically illustrated by FIG. 7. The reference cryptographic hash 520 may be updated responsive to detecting a legitimate modification of the contents of the secure memory 170, hence a difference between the calculated cryptographic hash 510 and the stored reference cryptographic hash 520 may indicate an unauthorized modification of the contents of the secure memory 170. Responsive to detecting an unauthorized modification of the contents of the secure memory 170, the access control unit 140 may signal a configuration error 530. In various illustrative examples, the above described validation of the contents of the secure memory 170 storing the access control data may be performed periodically (e.g., at a certain time interval) or responsive to a certain triggering event (e.g., responsive to receiving, from an initiator device, an access request 540 for access to a target device).

The access control unit 140 may process the access request 540 by the access rights validator 144 that may parse the request packet and validate the access rights by decoding one or more firewall configuration rules stored in the secure memory 170.

In addition to protecting the contents of the secure memory 170, the access control unit 140 may further comprise a control logic configured to detect or prevent the update of the memory 170 form being interrupted or avoided by a glitch or fault. A glitch-based attack is a method for violating the security of a hardware block by disrupting the execution of one or more data paths or assignments. For example, the attacker may apply a high-speed external disturbance or increase the internal clock frequency at the precise moment when a comparison or a sensitive assignment is about to be executed, thus effectively blocking the register assignment or update, perhaps bypassing a critical operation, such as a hash comparison, or even bypassing the whole hashing operation.

In certain implementations, the access control unit 140 may implement a Finite State Machine (FSM) that controls the different hardware states of the access control unit, comprising, for example, the states associated with the operations of receiving a programming message, validating the programming message, storing the received access control data in a secure memory, and controlling the access in view of the access control data, as described in more details herein below with references to blocks 1310, 1320, 1330, and 1340 of FIG. 13.

The FSM states may be binary encoded in such a way that any transition from a given state to another will have a change on at least 2 bits (Hamming distance exceeding 1) of the register containing the actual state value. For example, in the case of having a Hamming distance equal to 2, the attacker would need to induce two faults in the current-state register to jump the state. Since not all state encodings are actually used, even changing two bits on the current-state register might lead to an invalid state jump. All illegal states lead to a hardware interrupt or alarm that, for example, resets the access control unit.

In certain implementations, the access control unit 140 may further implement a hardware block that constantly monitors the state changes. This block may be used in conjunction with the above described state encoding. Even if a glitching attack occurred and the register has jumped to a valid state, the hardware monitor can detect it by comparing the last state to the current state. Before the error was induced, the last-state register had a Hamming distance of 2 compared to the current-state register. By inducing errors on the current state register, the Hamming distance to the last state register increases and can be verified by the hardware monitor. Moreover, the hardware monitor can also check that the next-state register is assigned correctly by verifying that the current-state register has a state that is allowed to go to the next-state value.

Figure 8A:
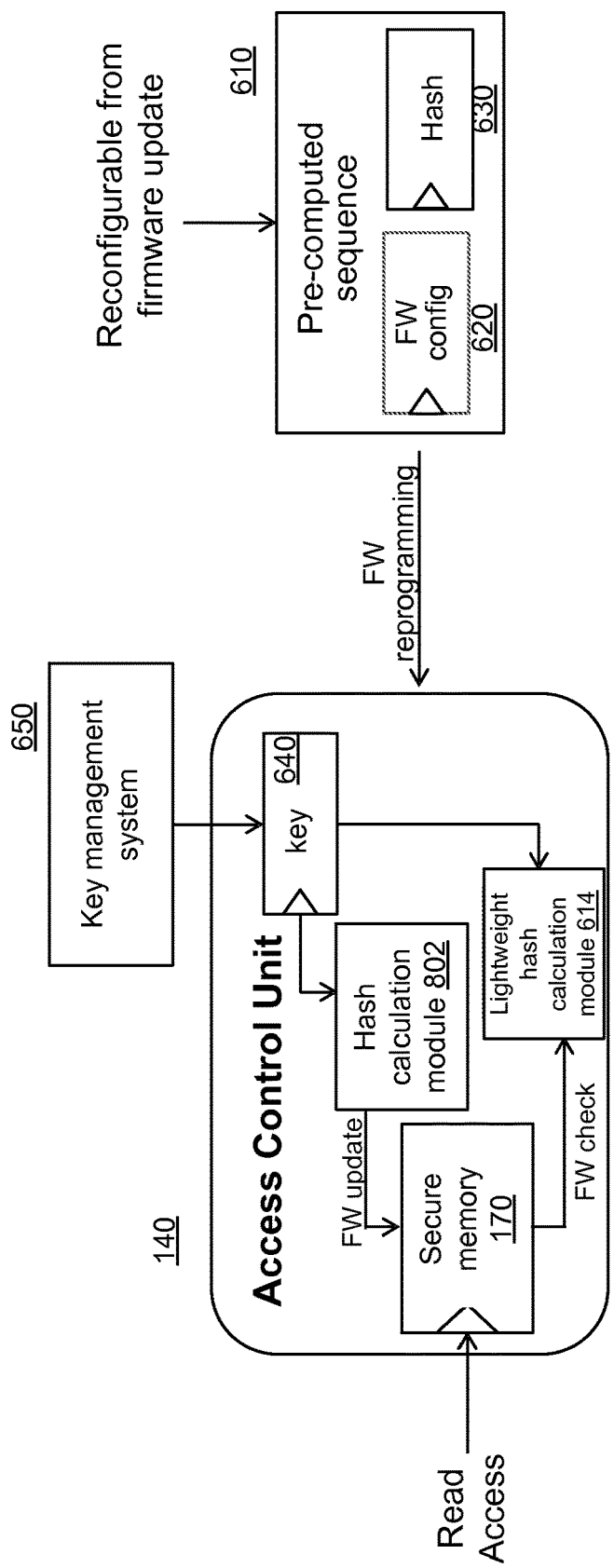
FIGS. 8A-8B schematically illustrate examples of initializing the access control data by firmware as part of the boot sequence of an example SoC, in accordance with one or more aspects of the present disclosure.

In certain implementations, the access control data stored by access control unit 140 in the secure memory 170 may comprise a fixed part that may be programmed by firmware as part of the boot sequence of SoC 100, and may further comprise a run-time programmable part that may be received from the programming agent 150 at runtime, as described in more details herein above. As schematically illustrated by FIG. 8A, a pre-computed sequence 610 comprising access control data 620 and a cryptographic hash 630 may be transmitted by firmware to the access control unit 140 that may authenticate the received sequence by employing a hash calculation module 802 to compute a value of a certain cryptographic hash function of the sequence using a cryptographic key 640 shared with the firmware. The cryptographic key 640 may be obtained from a key management system 650 or from software running in the programming unit. In certain implementations, the access control unit 140 may further comprise a lightweight hash calculation module 614 for validating the access control rules at each access request, as described in more details herein above with references to FIG. 6A.

Figure 8B:
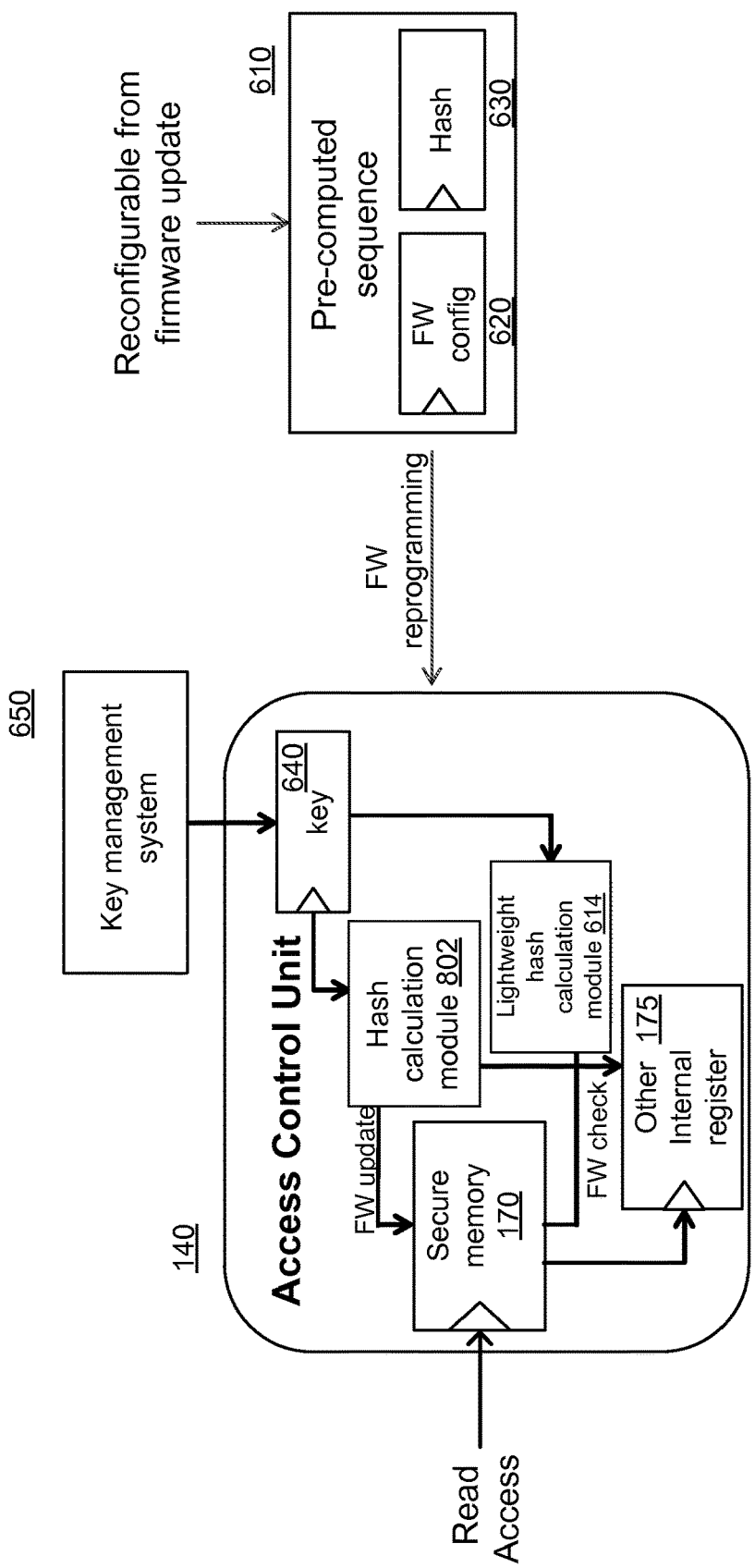

In certain implementations, the access control unit 140 may comprise one or more configuration registers that may only be modified by the above described procedure involving the authentication of the received message by computing a value of a certain cryptographic hash function of the received message using a cryptographic key 640 shared with the firmware. As schematically illustrated by FIG. 8B, the above described secure programming interface can be used for programming both the access control data (e.g., a firewall look-up table (FW LUT) stored in the secure memory 170) and one or more internal registers 175. In certain implementations, the above described integrity check procedures may be periodically performed to validate the contents of the secure memory 170 and/or the internal registers 175.

Figure 8C:
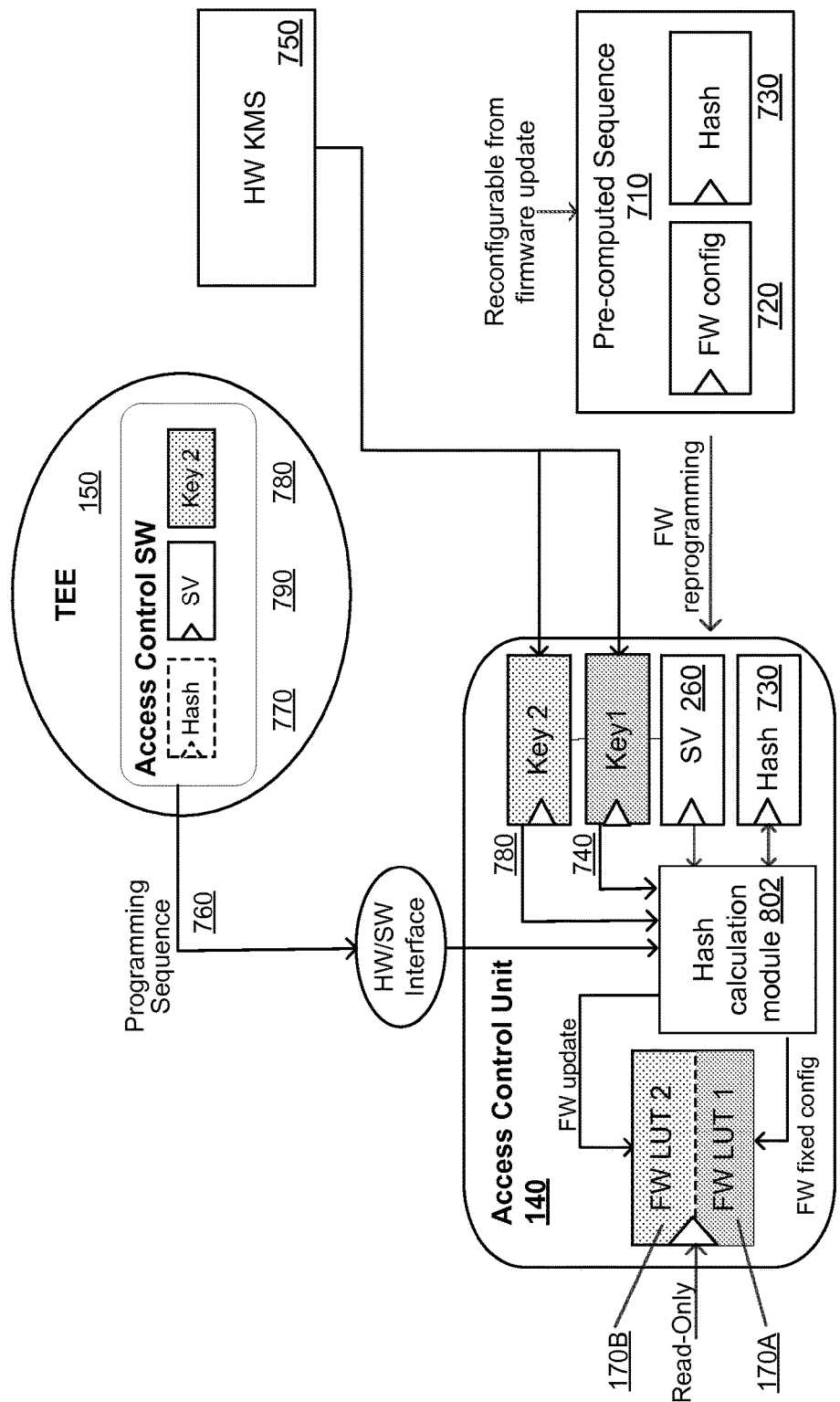
FIG. 8C schematically illustrates an example of storing, by an access control unit, the static access control data items programmable by firmware and the run-time programmable access control data items in separate memory locations, in accordance with one or more aspects of the present disclosure.

In certain implementations, the fixed part of the access control data (e.g., a first portion of a firewall look-up table (FW LUT)) programmable by firmware as part of the boot sequence of SoC 100 may be stored in a first secure memory location 170A, and the run-time programmable part of the access control data (e.g., a second portion of the FW LUT) may be stored in a second secure memory location 170B, as schematically illustrated by FIG. 8C.

The first secure memory location 170A may be protected from run-time updates, and hence may only be programmable by firmware as part of the boot sequence of SoC 100. A pre-computed sequence 710 comprising access control data 720 and a cryptographic hash 730 may be transmitted by firmware to the access control unit 140 that may authenticate the received sequence 710 by computing a value of a certain cryptographic hash function of the sequence using a first cryptographic key 740 that was utilized to sign or hash the firmware being loaded. The first cryptographic key 740 may be obtained from a key management system 750 or other key sources as described in more details herein above.

The second secure memory location 170B may be run-time programmable by the programming agent represented by a trusted execution environment (TEE) 150. The programming agent 150 may transmit a programming sequence 760 and a cryptographic hash 770 to the access control unit 140 that may authenticate the received sequence by computing a value of a certain cryptographic hash function of the sequence using the second cryptographic key 780 shared with the programming agent 150. The second cryptographic key 780 may be obtained from the key management system 750.

In certain implementations, the access control unit may be configured to interpret the boot-time programmable access control data as having priority over the run-time programmable access control data. In an illustrative example, the access control unit may be configured to disallow any access attempts violating a certain access authorization that has been set by the boot-time programmable access control data, even if the run-time programmable access control data overrides the access authorization.

Figure 9:
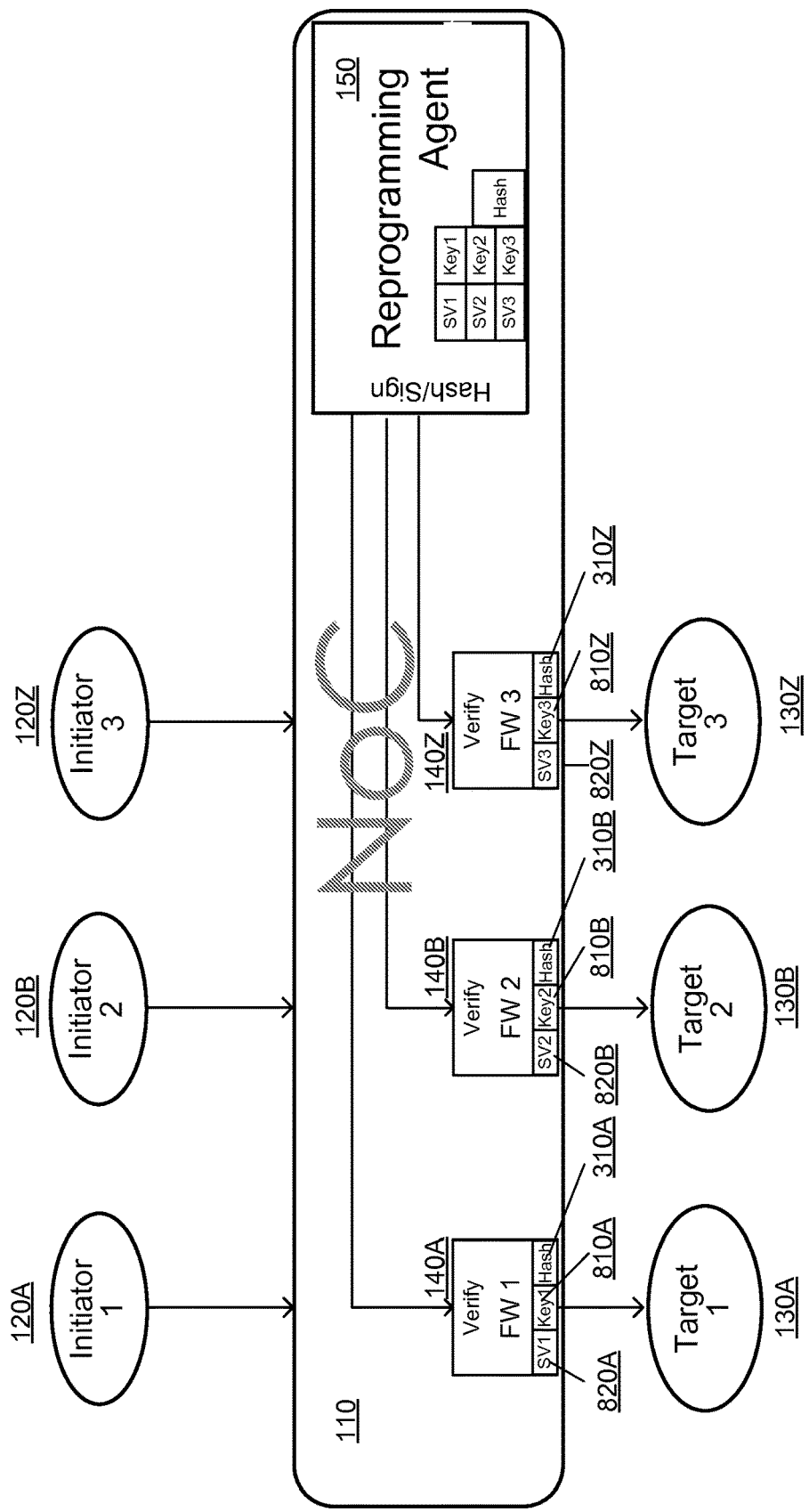
FIG. 9 schematically illustrates an example SoC comprising two or more access control units operating in accordance with one or more aspects of the present disclosure.

In certain implementations, an example SoC 100 operating in accordance with one or more aspects of the present disclosure may comprise two or more access control units 140A-140Z comprised by or coupled to the interconnect 110, as schematically illustrated by FIG. 9. In the illustrative example of FIG. 9, the interconnect 110 is represented by a NoC, and each access control unit 140A-140Z is represented by a firewall configured to enforce an access control policy while transporting data frames and/or electric signals between a plurality of initiator devices 120A-120Z and a plurality of target devices 130A-130Z. Alternatively, the access control unit 140 may be implemented by a memory management unit (MMU) configured to enforce the access control in view of access control data comprising one or more address translation rules, while translating virtual addresses to physical addresses referencing a memory location on a target device.

Multiple access control units 140 may receive programming sequences from a programming agent 150. In various illustrative examples, the programming agent 150 may be represented by an on-chip or off-chip agent communicatively coupled to the access control units 140.

In certain implementations, each access control unit 140 may share, with the programming agent 150, a cryptographic key 810A-810Z to be used for authenticating the programming sequences received by the access control unit, by calculating cryptographic hash values 310A-310Z, as described in more details herein above. Alternatively, the same cryptographic key may be shared between two or more access control units 140 of the SoC 100 and the programming agent 150. The cryptographic key may be obtained by the access control units 140 and the programming agent 150 from an on-chip or off-chip key management system.

Each of the access control units 140 may synchronize, with the programming agent 150, a state variable 820A-820Z upon the reset (e.g., within the boot sequence of the SoC 100) and/or during the operation. The state variable may be independently updated by each party based on the previous value and the actual state of the access control data stored by the corresponding access control unit 140. The state variable may be used in calculating the cryptographic hash of the programming sequences being transmitted by the programming agent 150, as described in more details herein above.

As noted herein above, the access control data may be represented by a plurality of access control rules. Each access control rule may comprise an identifier of the initiator device, an identifier of the target device, a target device address range, access permissions (e.g., "read," "write," and/or "execute" "secure" or "debug"), and/or an access authorization type (e.g., "allow" or "deny").

Figure 10A:
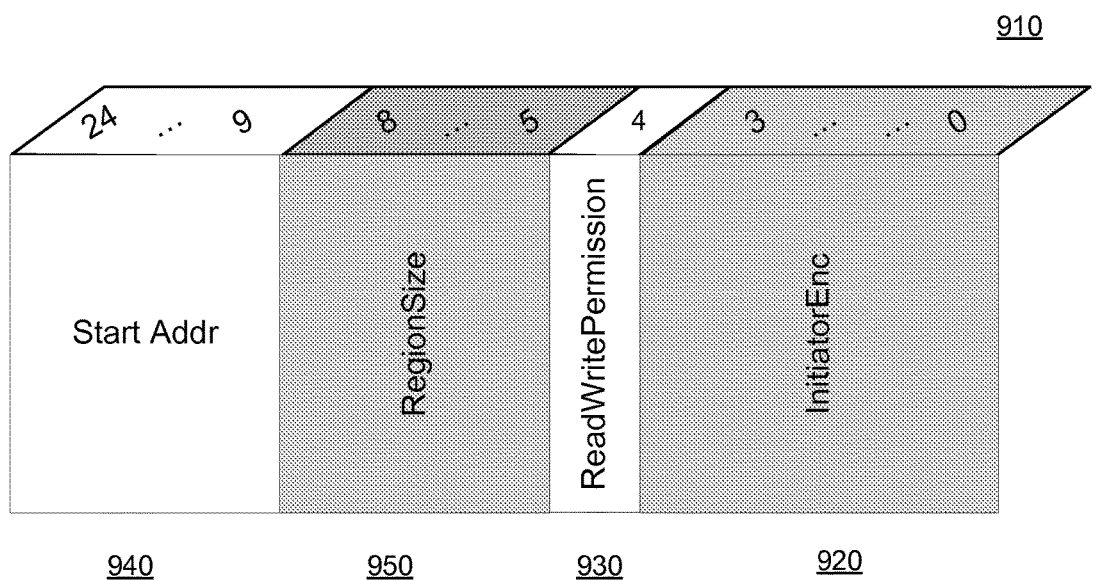
FIGS. 10A-10B schematically illustrate various examples of access control rules, in accordance with one or more aspects of the present disclosure.

In the illustrative example of FIG. 10A, an access control rule 910 may comprise an identifier of the initiator device 920, an access permission field 930, an identifier 940 of the start of an address space region on the target device, and the region size 950. In various illustrative examples, the identifiers of the initiator device 920 may be represented by a network address or by an identifier from an arbitrarily selected name space. In certain implementations, a device (initiator or target) identifier may identify two or more devices. The access permission field 930 may comprise one or more bits encoding the read, write, and/or execute access permissions. The target region may correspond to a memory block comprising a plurality of memory pages.

Figure 10B:
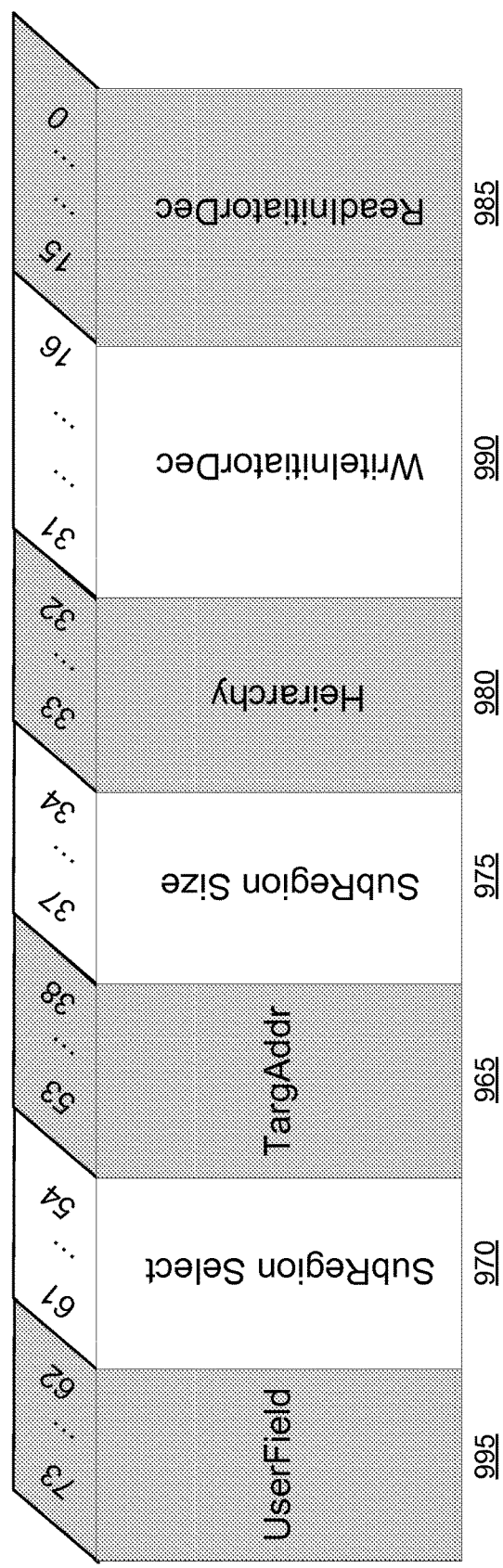

In the illustrative example of FIG. 10B, an access control rule 960 may comprise a target address 965, a target sub-region selector 970, a target sub-region size 975, a priority level 980, identifiers of the initiator device 985, 990, and a user-defined field 995.

Each of the initiator device identifiers 985, 990 may identify one or more identifier devices associated with a pre-defined set of access permissions to the target device. In an illustrative example, the initiator device identifier 985 may identify one or more identifier devices having the read access permission to the target device, while the initiator device identifier 990 may identify one or more identifier devices having the write access permission to the target device.

The target address field 965 may specify the starting address of the address space region. The target sub-region selector field 970 may specify a sub-region of the address space region, thus allowing to define non-contiguous address space regions. The target sub-region size 975 field may specify the size of the address space sub-region.

In certain implementations, the access control rules may be assigned different priority values. The access control unit may be configured to interpret access control rules associated with higher priority levels as overriding access control rules associated with lower priority levels. Priorities of the access control rules may be specified by the priority level field 980.

Figure 11A:
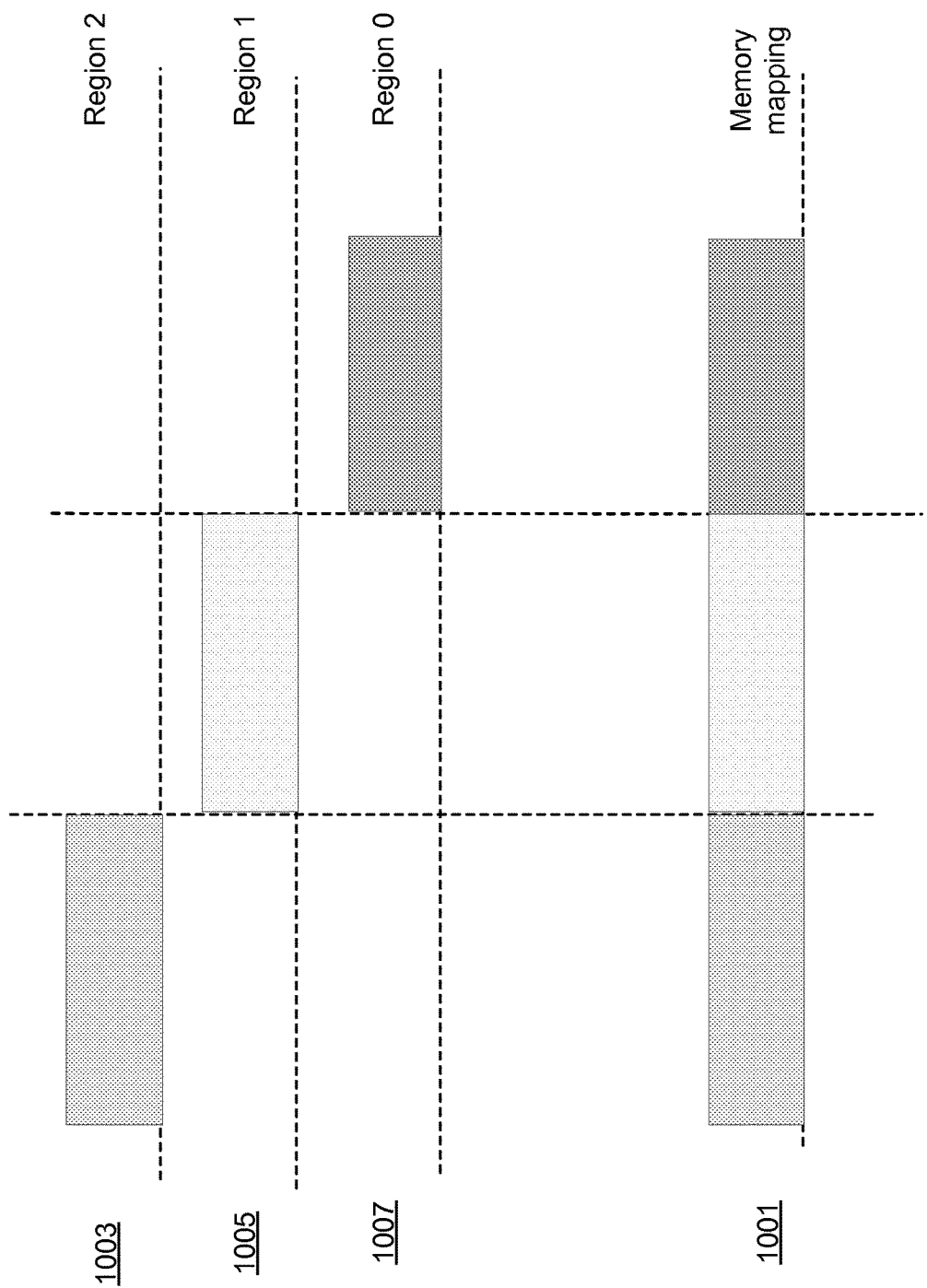
FIGS. 11A-11B schematically illustrate various examples of overlapping and non-overlapping memory ranges used to define access control rules, in accordance with one or more aspects of the present disclosure.

In various illustrative examples, access control policies may comprise multiple access control rules defined on various target device address ranges. In the illustrative example of FIG. 11A, the address ranges 1003, 1005, and 1007 are not overlapping as they are mapped on different ranges of the address space 1001. Thus, three or more independent access control rules may be defined on the address ranges 1003, 1005, and 1007.

Figure 11B:
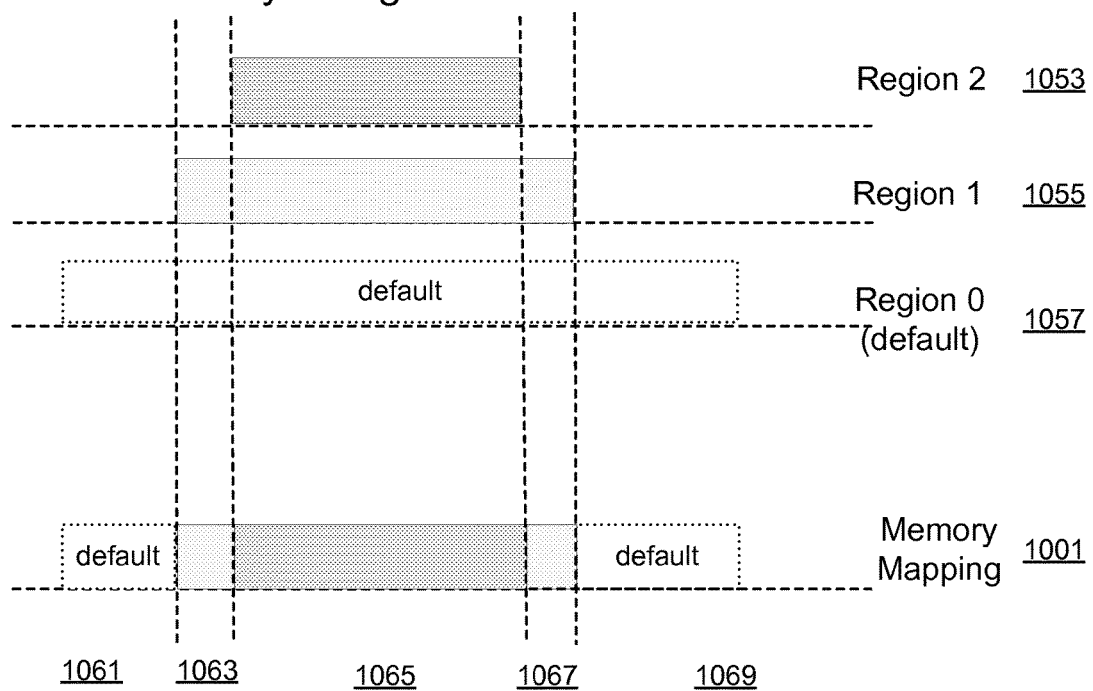

A more compact rule set may be defined using a plurality of overlapping address ranges. In the illustrative example of FIG. 11B, the address ranges 1053, 1055, and 1057 are overlapping and hence define five distinct regions 1061, 1063, 1065, 1067, and 1069 within the address space 1001. In certain implementations, the access control rules defined on the address ranges 1053, 1055, and 1057 may be assigned different priority values, so that the access control rule defined on an address range having a higher priority value would override access control rules defined on other address ranges. In certain implementations, a default address range 1057 having the lowest priority may be defined to include all other defined address ranges, thus precluding the rule set from having undefined address ranges ("holes"). In an illustrative example, an access rule universally denying access to all initiator devices may be associated with the default address range 1057, so that the other access rules may selectively allow access to certain address ranges by certain initiator devices.

Figure 12:
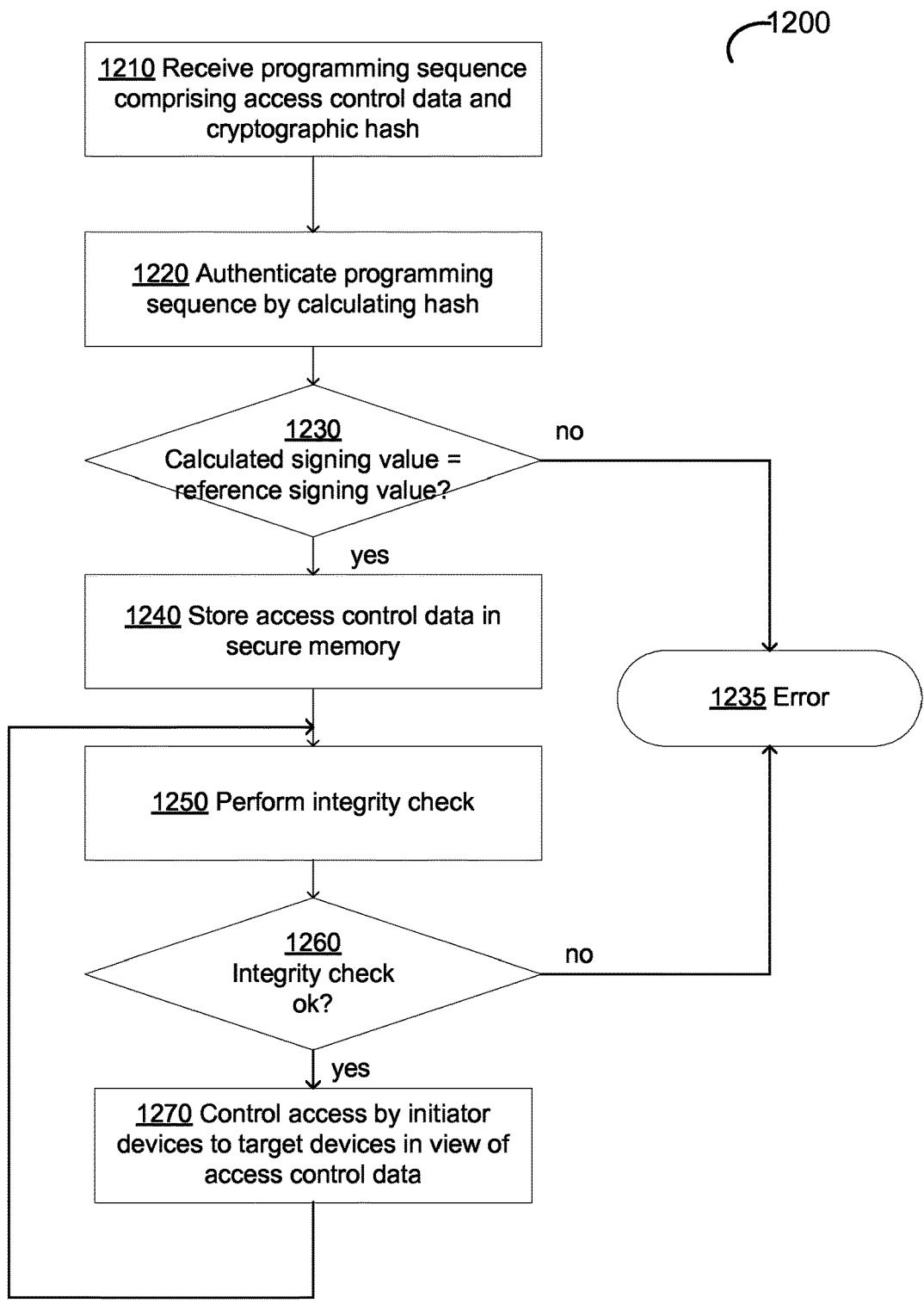
FIGS. 12-13 depict flow diagrams of example methods for authenticating incoming messages comprising access control data by access control units operating in accordance with one or more aspects of the present disclosure.

FIG. 12 depicts a flow diagram of an example method 1200 for authenticating incoming messages comprising access control data by an access control unit operating in accordance with one or more aspects of the present disclosure. Method 1200 and/or each of its individual functions, routines, subroutines, or operations may be performed by one or more general purpose and/or specialized processing devices. Two or more functions, routines, subroutines, or operations of method 1200 may be performed in parallel or in an order that may differ from the order described above. In certain implementations, method 1200 may be performed by a single processing thread. Alternatively, method 1200 may be performed by two or more processing threads, each thread executing one or more individual functions, routines, subroutines, or operations of the method. In an illustrative example, the processing threads implementing method 1200 may be synchronized (e.g., using semaphores, critical sections, and/or other thread synchronization mechanisms). Alternatively, the processing threads implementing method 1200 may be executed asynchronously with respect to each other. In an illustrative example, method 1200 may be performed by computing device 1000 described herein below with references to FIG. 16.

Referring to FIG. 12, at block 1210, a SoC implementing the method may receive, from a programming agent, a message comprising a programming sequence and a cryptographic hash value associated with the programming sequence. The programming sequence may comprise one or more access control data items (e.g., access control rules). The cryptographic hash value may be produced by applying a certain cryptographic hash function to the programming sequence, a cryptographic key pre-shared between the programming agent and the access control unit, and a state variable that reflects the state of communications between the programming agent and the access control unit, as described in more details herein above.

At block 1220, the SoC may authenticate the message by computing a value of the cryptographic hash function using the shared cryptographic key and optionally using the state variable. The cryptographic key may be obtained from an on-chip or off-chip key management system, as described in more details herein above.

Responsive to determining, at block 1230, that the calculated cryptographic hash determined by applying the cryptographic hash function to the received message matches the cryptographic hash received within the message, the processing may continue at block 1240. Otherwise, if the calculated cryptographic hash differs from the received cryptographic hash, a communication error with the programming agent may be signaled at block 1235, and the programming sequence may be discarded.

At block 1240, the SoC may store the received access control data items in a memory data structure residing in a secure memory. In certain implementations, the memory data structure may be represented by a look-up table comprising a plurality of access control rules. Each access control rule may comprise an identifier of the initiator device, an identifier of the target device, a target device address range, an access permission (e.g., "read," "write," and/or "execute"), and/or an access authorization type (e.g., "allow" or "deny"), as described in more details herein above.

At block 1250, the SoC may validate the integrity of the access control data stored by the access control unit, by comparing a stored reference value with a value of a cryptographic hash function of the access control data calculated by the access control unit, as described in more details herein above.

Responsive to determining, at block 1260, that the stored reference value matches the value of the cryptographic hash function of the access control data calculated by the access control unit, the processing may continue at block 1270. Otherwise, an error may be signaled at block 1235, and one or more implementation-specific recovery actions may be performed.

At block 1270, the access control unit may control, in view of the access control data, access by initiator devices to target devices or target addresses. In certain implementations, the access control unit may be implemented by a network-on-chip (NoC) comprising a filtering firewall configured to enforce the access control in view of the access control data while transporting control and data frames or electric signals between initiator devices and target devices and back to initiators, as described in more details herein above. Alternatively, the access control unit may be implemented at the ingress to a network in or functionally near an MMU configured to enforce the access control based on the access control data while translating virtual addresses to physical memory addresses on various target devices, as described in more details herein above.

Responsive to completing operations described with reference to block 1270, the method may loop back to block 1250, as the integrity of the stored access control data may be validated repeatedly, e.g., responsive to detecting a triggering event or responsive to expiration of a timeout.

Figure 13:
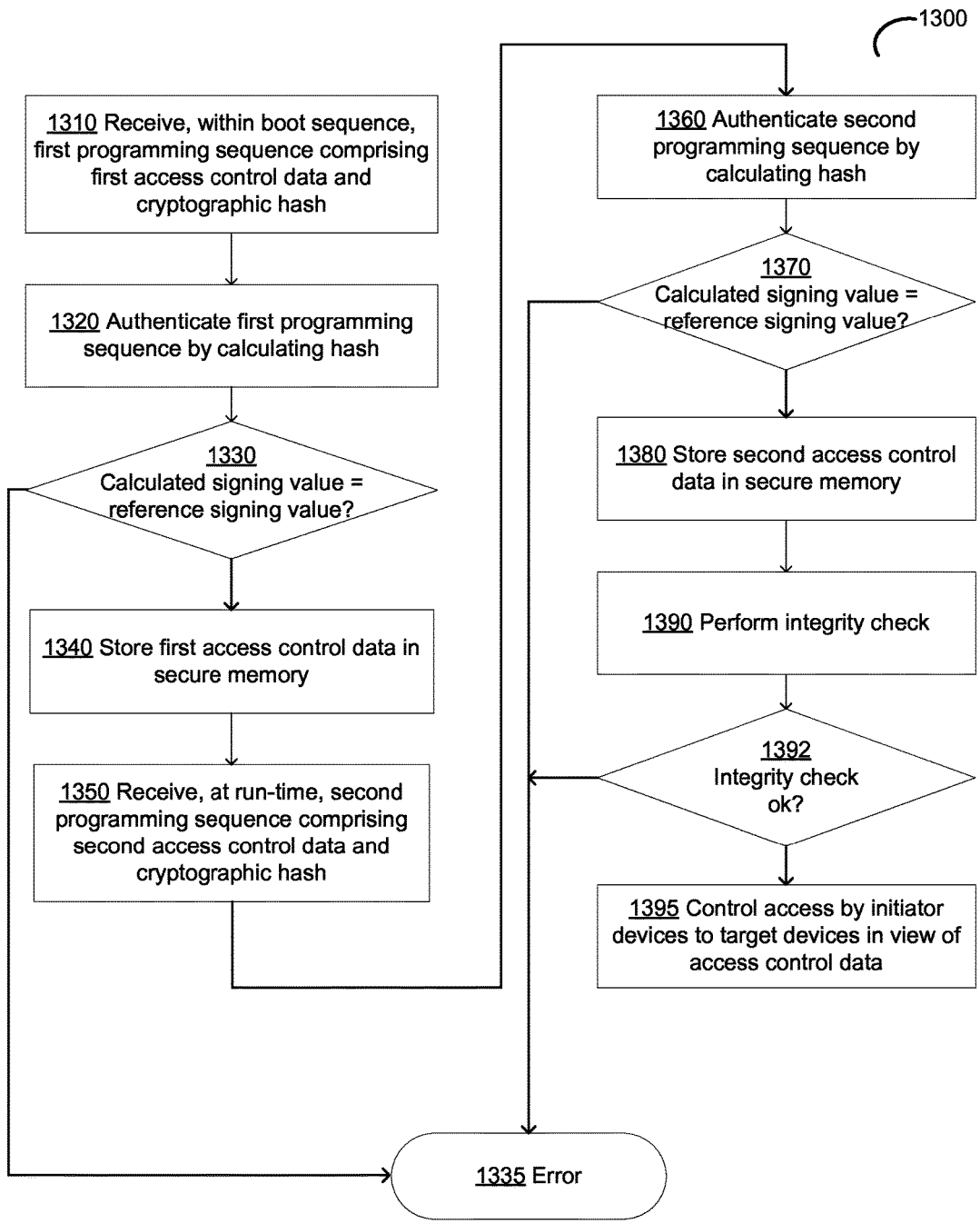

FIG. 13 depicts a flow diagram of an example method 1300 for authenticating incoming messages comprising access control data by an access control unit comprising a firmware-only programmable storage and a run-time programmable storage, in accordance with one or more aspects of the present disclosure. Method 1300 and/or each of its individual functions, routines, subroutines, or operations may be performed by one or more general purpose and/or specialized processing devices. Two or more functions, routines, subroutines, or operations of method 1300 may be performed in parallel or in an order that may differ from the order described above. In certain implementations, method 1300 may be performed by a single processing thread. Alternatively, method 1300 may be performed by two or more processing threads, each thread executing one or more individual functions, routines, subroutines, or operations of the method. In an illustrative example, the processing threads implementing method 1300 may be synchronized (e.g., using semaphores, critical sections, and/or other thread synchronization mechanisms). Alternatively, the processing threads implementing method 1300 may be executed asynchronously with respect to each other. In an illustrative example, method 1300 may be performed by computing device 1000 described herein below with references to FIG. 16.

Referring to FIG. 13, at block 1310, a SoC implementing the method may receive, from a first programming agent, a first message comprising a programming sequence and a value of a certain cryptographic hash function of the programming sequence. In certain implementations, the message may be received within the boot sequence of the SoC. The programming sequence may comprise one or more access control data items (e.g., access control rules). The cryptographic hash value may be produced by applying a certain cryptographic hash function to the programming sequence, a cryptographic key pre-shared between the first programming agent and the access control unit, and a state variable that reflects the state of communications between the programming agent and the access control unit, as described in more details herein above.

At block 1320, the SoC may authenticate the first message by computing a cryptographic hash function using the cryptographic key shared with the first programming agent, as described in more details herein above. The cryptographic key may be obtained from an on-chip or off-chip key management system, as described in more details herein above.

Responsive to determining, at block 1330, that the calculated cryptographic hash determined by applying the cryptographic hash function to the first message matches the cryptographic hash received within the first message, the processing may continue at block 1340. Otherwise, if the calculated cryptographic hash differs from the received cryptographic hash, a communication error with the programming agent may be signaled at block 1335, and the programming sequence may be discarded.

At block 1340, the SoC may store the received access control data items in a first memory data structure residing in a first secure memory location. In certain implementations, the first secure memory location may be protected from run-time updates, and hence may only be programmed by firmware within the boot sequence of the SoC, as described in more details herein above.

At block 1350, the SoC may receive, from a second programming agent, a second message comprising a programming sequence and a value of a certain cryptographic hash function of the programming sequence. In certain implementations, the message may be received at run-time. The programming sequence may comprise one or more access control data items (e.g., access control rules). The signing may be produced by applying a certain cryptographic hash function to the programming sequence, a cryptographic key pre-shared between the second programming agent and the access control unit, and a state variable that reflects the state of communications between the second programming agent and the access control unit, as described in more details herein above.

At block 1360, the SoC may authenticate the second message by computing a cryptographic hash function using the cryptographic key shared with the second programming agent, as described in more details herein above.

Responsive to determining, at block 1370, that the calculated cryptographic hash value determined by applying the cryptographic hash function to the second message matches the cryptographic hash received within the second message, the processing may continue at block 1380. Otherwise, if the calculated cryptographic hash differs from the received cryptographic hash, a communication error with the programming agent may be signaled at block 1335, and the programming sequence may be discarded.

At block 1380, the SoC may store the received access control data items in a second memory data structure residing in a second secure memory location. In certain implementations, the second secure memory location may be programmable at run-time, as described in more details herein above.

At block 1390, the SoC may validate the integrity of the access control data stored by the access control unit, by comparing a stored reference value with a value of a cryptographic hash function of the access control data calculated by the access control unit, as described in more details herein above.

Responsive to determining, at block 1392, that the stored reference value matches the value of the cryptographic hash function of the access control data calculated by the access control unit, the processing may continue at block 1395.

Otherwise, an error may be signaled at block 1335, and one or more implementation-specific recovery actions may be performed.

At block 1395, the access control unit may control, in view of the access control data, access by initiator devices to target devices. In certain implementations, the access control unit may be configured to interpret the boot-time programmable access control data as having priority over the run-time programmable access control data. In an illustrative example, the access control unit may be configured to disallow any access attempts violating a certain access authorization that has been set by the boot-time programmable access control data, even if the run-time programmable access control data overrides the access authorization, as described in more details herein above.

Responsive to completing operations described with reference to block 1395, the method may loop back to block 1390, as the integrity of the stored access control data may be validated repeatedly, e.g., responsive to detecting a triggering event or responsive to expiration of a timeout.

Figure 14:
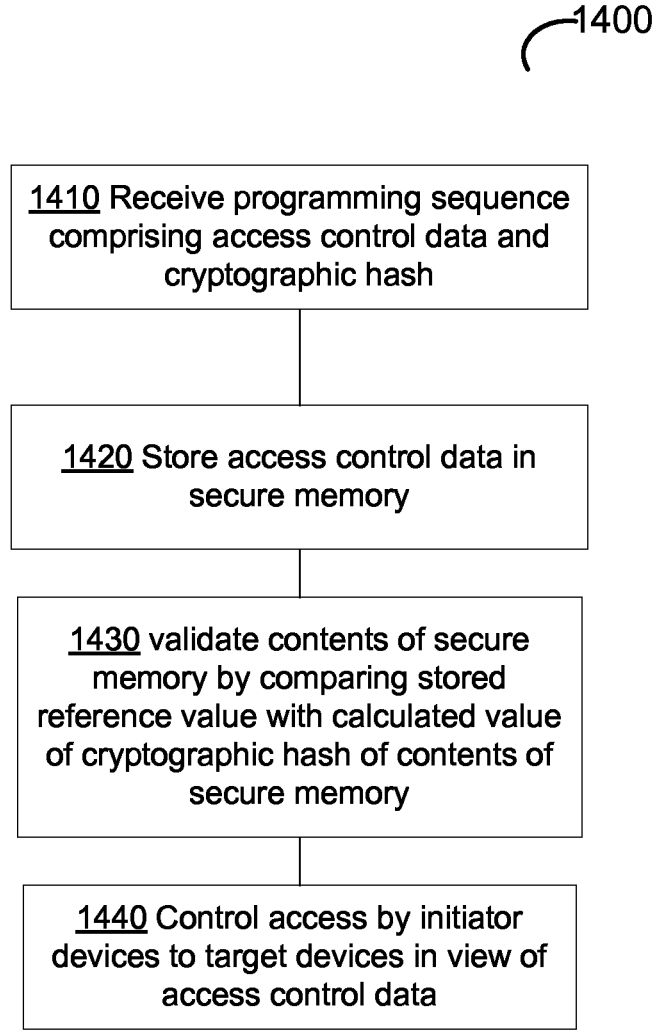
FIG. 14 depicts a flow diagram of an example method for validating the contents of a secure memory storing access control data, in accordance with one or more aspects of the present disclosure.

FIG. 14 depicts a flow diagram of an example method for validating the contents of a secure memory storing access control data, in accordance with one or more aspects of the present disclosure. Method 1400 and/or each of its individual functions, routines, subroutines, or operations may be performed by one or more general purpose and/or specialized processing devices. Two or more functions, routines, subroutines, or operations of method 1400 may be performed in parallel or in an order that may differ from the order described above. In certain implementations, method 1400 may be performed by a single processing thread. Alternatively, method 1400 may be performed by two or more processing threads, each thread executing one or more individual functions, routines, subroutines, or operations of the method. In an illustrative example, the processing threads implementing method 1400 may be synchronized (e.g., using semaphores, critical sections, and/or other thread synchronization mechanisms). Alternatively, the processing threads implementing method 1400 may be executed asynchronously with respect to each other. In an illustrative example, method 1400 may be performed by computing device 1000 described herein below with references to FIG. 16.

Referring to FIG. 14, at block 1410, a SoC implementing the method may receive, from a programming agent, a message comprising a programming sequence and a value of a certain cryptographic hash function of the programming sequence. The programming sequence may comprise one or more access control data items (e.g., access control rules). The cryptographic hash may be produced by applying a certain cryptographic hash function to the programming sequence, a cryptographic key pre-shared with the access control unit, and a state variable that reflects the state of communications between the programming agent and the access control unit, as described in more details herein above.

At block 1420, the SoC may store the received access control data items in a memory data structure residing in a secure memory, as described in more details herein above.

At block 1430, the SoC may validate the contents of the secure memory by comparing a stored reference value with a calculated value of a cryptographic hash function of the contents of the secure memory. In an illustrative example, the access control unit may calculate a value of a certain cryptographic hash function of the contents of the secure memory and compare the calculated cryptographic hash with a reference cryptographic hash stored in a secure register of the SoC. The reference cryptographic hash may be updated responsive to detecting every legitimate modification of the contents of the secure memory, hence a difference between the calculated cryptographic hash and the stored reference cryptographic hash may indicate an unauthorized modification of the contents of the secure memory. Responsive to detecting an unauthorized modification of the contents of the secure memory, the access control unit may signal a configuration error.

At block 1440, the access control unit may control, in view of the access control data, access by initiator devices to target devices, as described in more details herein above.

In various illustrative examples, a SoC comprising an access control unit operating in accordance with one or more aspects of the present disclosure may be utilized by general purpose and specialized computing devices that are employed for processing of information that needs to be protected from unauthorized access or tampering, including, e.g., digital rights management (DRM) applications, processing of financial information such as credit card or account numbers, receiving and handling the data that originated by various peripheral devices, such as still image or video cameras, microphones, etc.

Figure 15:
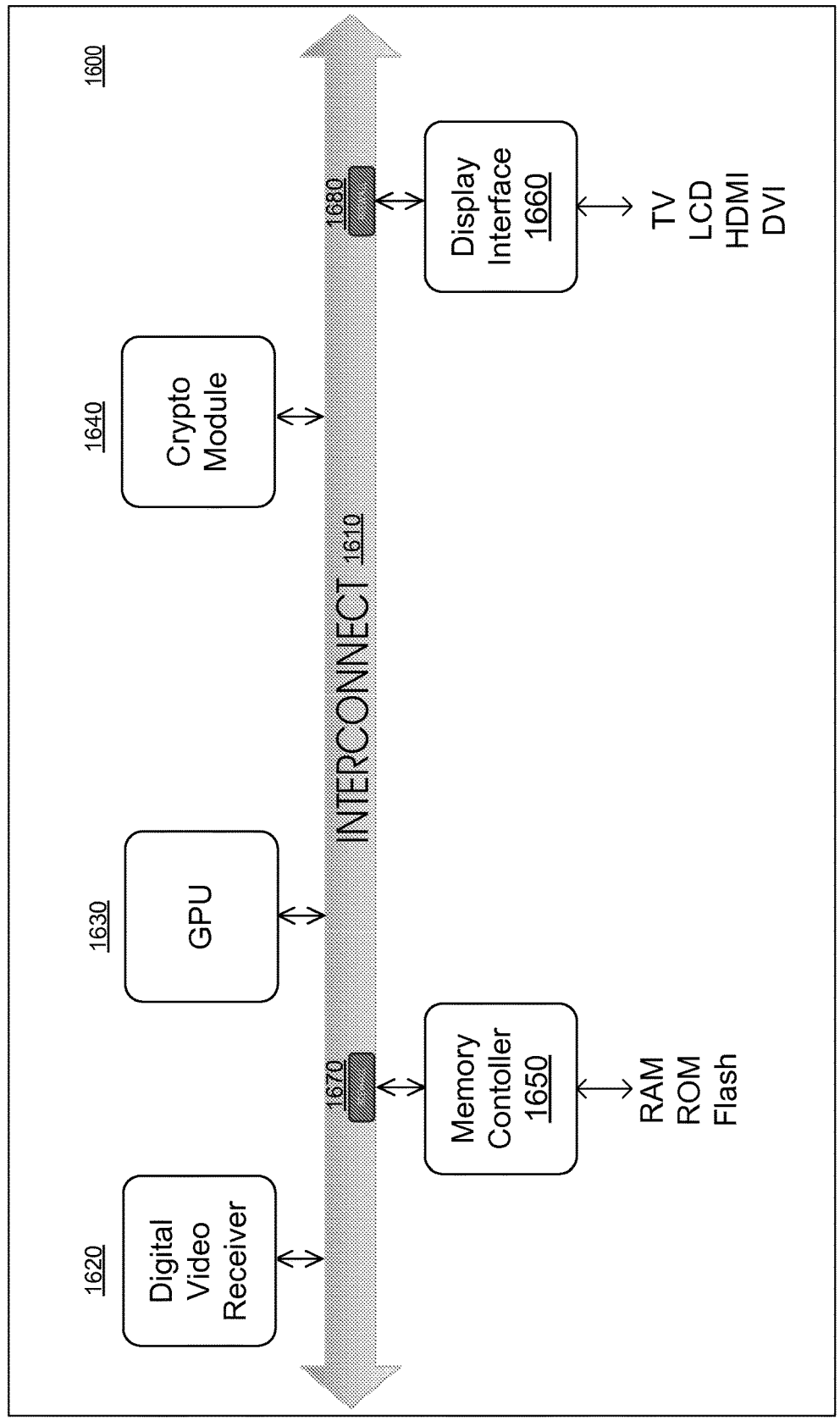
FIG. 15 illustrates a high-level component diagram of a video processing system comprising an access control unit operating in accordance with one or more aspects of the present disclosure.

FIG. 15 illustrates a high-level component diagram of a video processing system that comprises an on-chip access control unit operating in accordance with one or more aspects of the present disclosure. The example video processing system comprises an interconnect 1610 that may, in various illustrative examples, be provided by a NoC. Coupled to the interconnect 1610 are a digital video receiver 1620, a graphic processing unit (GPU) 1630, a crypto module 1640, a memory controller 1650, and a display interface 1660.

The example video processing system further comprises access control units 1670, 1680 that are configured to control access by various initiator devices, including the digital video receiver 1620 and the GPU 1630, to the memory coupled to the memory controller 1650 and/or to the video display devices coupled to the display interface 1660. In various illustrative examples, access control units 1670, 1680 may reside within the interconnect 110 or be coupled to the interconnect 110 on the initiator or target device side.

The access control units 1670, 1680 may be programmed by an on-chip or an external programming agent that may transmit messages comprising access control data items (e.g., access control rules). In accordance with one or more aspects of the present disclosure, the access control units 1670, 1680 may share, with one or more programming agents, one or more cryptographic keys that may be used for authentication of programming sequences transmitted by the programming agent 150 of FIG. 1. The cryptographic key may be obtained by the access control unit 140 of FIG. 1 and the programming agent 150 from an on-chip or off-chip key management system.

In an illustrative example, the digital video receiver 1620 may transmit an encrypted video stream to the memory via the memory controller 1650. The encrypted video stream may then be retrieved by the crypto module 1640 which may decrypt the encrypted data to produce a decrypted video stream. The crypto module may then transmit the decrypted data to the memory via the memory controller 1650. The GPU 1630 may then securely retrieve the decrypted video stream from the memory, process the video stream (e.g., decode, resize, crop, and/or rotate one or more video frames) and then transmit one or more video frames to a display device via the display interface 1660.

The access control unit 1670 may be programmed to prevent unauthorized access to the unencrypted video stream stored in the memory by only allowing read access to the memory regions that store the unencrypted video stream by the GPU 1630 and potential write access to the crypto module 1640. The access control unit 1680 may be programmed to prevent unauthorized access to the unencrypted video stream stored by the display interface 1660 by only allowing access to the display interface by the GPU 1630. In accordance with one or more aspects of the present disclosure, the access control unit 1670 and/or the access control unit 1680 may be securely programmed with the access control rules within the boot sequence of the video processing system 1600 and/or at run-time, as described in more details herein above. Various other components of the video processing system 1600 (not shown in FIG. 15) that are not part of the secure video pipeline (e.g., the CPU) may be denied access to the unencrypted video stream.

Figure 16:
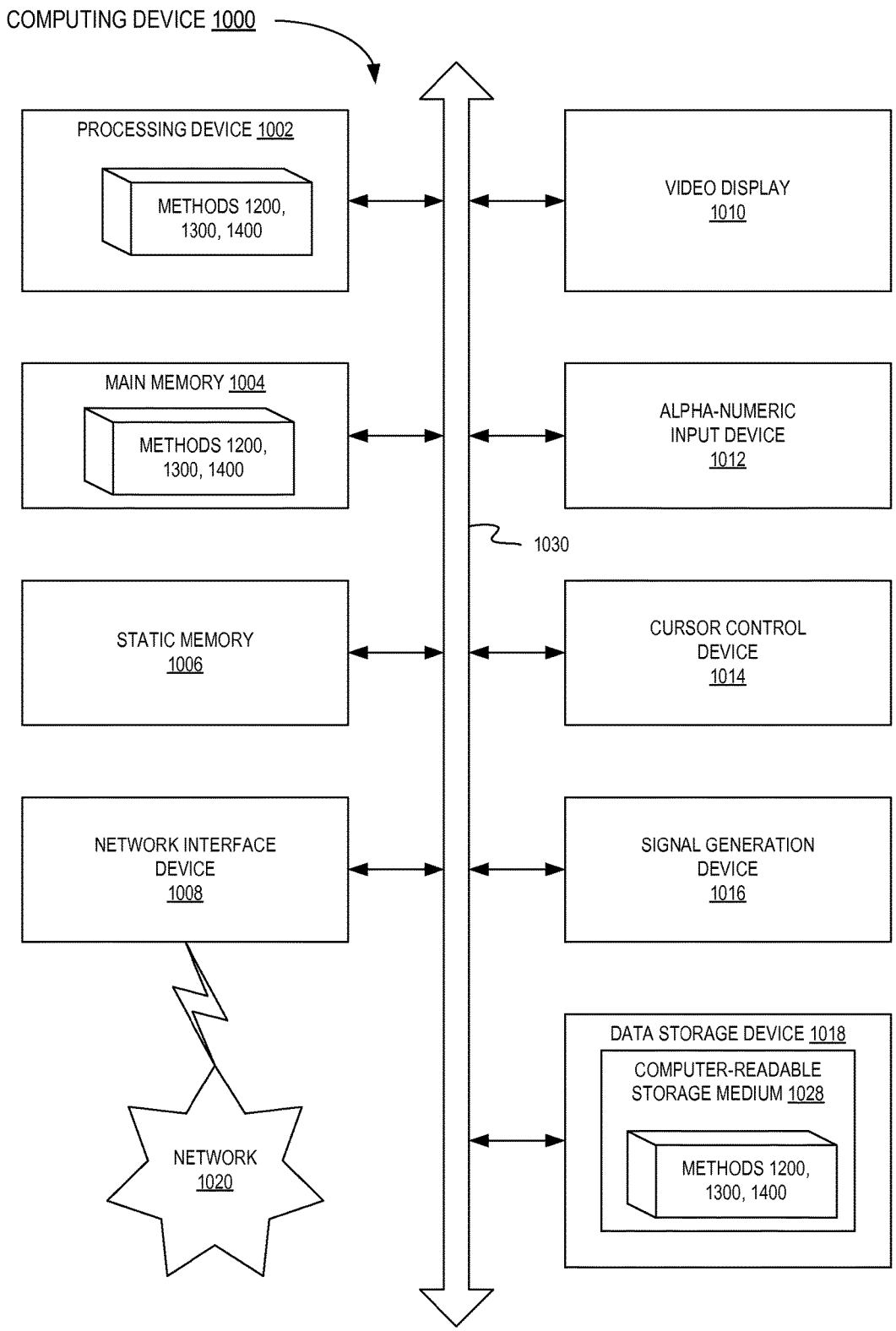
FIG. 16 illustrates a diagrammatic representation of a computing device which may incorporate the SoC described herein and within which a set of instructions, for causing the computing device to perform the methods described herein, may be executed.

FIG. 16 illustrates a diagrammatic representation of a computing device 1000 which may incorporate the SoC described herein and within which a set of instructions, for causing the computing device to perform the methods described herein, may be executed. Computing device 1000 may be connected to other computing devices in a LAN, an intranet, an extranet, and/or the Internet. The computing device may operate in the capacity of a server machine in client-server network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods described herein.

The example computing device 1000 may include a processing device 1002, which in various illustrative examples may be provided by the SoC 100 of FIG. 1. The example computing device 1000 may further comprise a main memory 1004 (e.g., synchronous dynamic random access memory (DRAM), read-only memory (ROM)), a static memory 1006 (e.g., flash memory and a data storage device 1018), which may communicate with each other via a bus 1030.

The processing device 1002 may be configured to execute methods 1200, 1300 for authenticating incoming messages comprising access control data by an access control unit, and/or method 1400 for validating the contents of a secure memory storing access control data, in accordance with one or more aspects of the present disclosure for performing the operations and steps described herein.

The example computing device 1000 may further include a network interface device 1008 which may communicate with a network 1020. The example computing device 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse) and an acoustic signal generation device 1016 (e.g., a speaker). In one embodiment, the video display unit 1010, the alphanumeric input device 1012, and the cursor control device 1014 may be combined into a single component or device (e.g., an LCD touch screen).

The data storage device 1018 may include a computer-readable storage medium 1028 on which may be stored one or more sets of instructions (e.g., instructions of methods 1200, 1300, and/or 1400, in accordance with one or more aspects of the present disclosure) implementing any one or more of the methods or functions described herein. Instructions implementing methods 1200, 1300, and/or 1400 may also reside, completely or at least partially, within the main memory 1004 and/or within the processing device 1002 during execution thereof by the example computing device 1000, hence the main memory 1004 and the processing device 1002 may also constitute or comprise computer-readable media. The instructions may further be transmitted or received over the network 1020 via the network interface device 1008.

While the computer-readable storage medium 1028 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "updating", "identifying", "determining", "sending", "assigning", or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc. as used herein are meant as labels to distinguish among different elements and may not necessarily have an ordinal meaning according to their numerical designation.

Examples described herein also relate to an apparatus for performing the methods described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

What is claimed is:

1. A system-on-chip (SoC), comprising a hardware access control unit, the hardware access control unit comprising a secure memory for storing access control data, the hardware access control unit to:
   receive, from a programming agent, a message comprising an access control data item;
   store the access control data item in the secure memory;
   update a state variable reflecting a state of communications between the hardware access control unit and the programming agent, by applying a non-linear function to a current value of the state variable, a cryptographic key shared between the programming agent and the hardware access control unit, and a hash of contents of the secure memory;
   calculate a message digest by applying a first cryptographic hash function to contents of the message, a cryptographic key the state variable;
   authenticate the message using the message digest;
   repeatedly validate the access control data item for detecting unauthorized modification of the access control data item stored in the secure memory, wherein validating the access control data item comprises comparing a value of a second cryptographic hash function of the access control data item to a stored reference value; and
   control, in view of the access control data item, access by an initiator device to a target device.

2. The SoC of claim 1, wherein the access control data item comprises an access control rule.

3. The SoC of claim 2, wherein the access control rule comprises an identifier of the initiator device, an identifier of the target device, an address range, and an access permission.

4. The SoC of claim 1, wherein the hardware access control unit is implemented by a network-on-chip (NoC) comprising a filtering firewall to enforce access control in view of the access control data item while transporting at least one of data frames or electric signals between the initiator device and the target device.

5. The SoC of claim 1, wherein the hardware access control unit is implemented by a memory management unit (MMU) to enforce access control in view of the access control data item while translating a first address to a second address referencing a memory location on the target device.

6. The SoC of claim 1, wherein the initiator device is provided by one of: a central processing unit (CPU), a graphical processing unit (GPU), or a cryptographic core.

7. The SoC of claim 1, wherein the target device is provided by one of: a memory device, a storage device, or an input/output (I/O) device.

8. The SoC of claim 1, further comprising a cryptographic key management system to generate the cryptographic key.

9. The SoC of claim 1, wherein the access control data item comprises an address translation rule.

10. A system-on-chip (SoC), comprising a hardware access control unit, the hardware access control unit comprising a first secure memory and a second secure memory for storing access control data, the hardware access control unit to:
    receive, from a programming agent, a first message comprising a first access control data item;
    store the first access control data item in the first secure memory;
    update a state variable reflecting a state of communications between the hardware access control unit and the programming agent, by applying a non-linear function to a current value of the state variable, a cryptographic key shared between the programming agent and the hardware access control unit, and a hash of contents of the first secure memory;
    calculate a first message digest by applying a first cryptographic hash function to contents of the first message, the cryptographic key the state variable;
    authenticate the first message using the first message digest;
    receive a second message comprising a second access control data item;
    store the second access control data item in the second secure memory;
    responsive to detecting a triggering event, validating the first access control data item for detecting unauthorized modification of the first access control data item stored in the first secure memory, wherein validating the first access control data item comprises comparing a value of a second cryptographic hash function of the first access control data item to a stored reference value;
    validate the second access control data item for detecting unauthorized modification of the second access control data item stored in the second secure memory;
    interpret the first access control data item as subordinate to the second access control data item; and
    control, in view of the second access control data item, access by an initiator device to a target device.

11. A method, comprising:
    receiving, by a hardware access control unit, from a programming agent, a message comprising an access control data item;
    storing the access control data item in a secure memory;
    updating a state variable reflecting a state of communications between the hardware access control unit and the programming agent, by applying a non-linear function to a current value of the state variable, a cryptographic key shared between the programming agent and the hardware access control unit, and a hash of contents of a secure memory;
    calculating a message digest by applying a first cryptographic hash function to contents of the message, the cryptographic key and the state variable;
    authenticating the message using the message digest;
    repeatedly, responsive to detecting a triggering event, validating the access control data item for detecting unauthorized modification of the access control data item stored in the secure memory, wherein validating the access control data item comprises comparing a value of a second cryptographic hash function of the access control data item to a stored reference value; and
    controlling, in view of the access control data item, access by an initiator device to a target device.

12. The method of claim 11, wherein the access control data item comprises an access control rule.

13. The method of claim 12, wherein the access control rule comprises at least one of: an identifier of the initiator device, an identifier of the target device, an address range, an access permission, or an access authorization type.

14. The method of claim 11, wherein the controlling further comprises filtering data frames traversing the hardware access control unit based on an access control rule set comprising a plurality of access control rules defined on non-overlapping address ranges.

15. The method of claim 11, the controlling further comprises filtering data frames traversing the hardware access control unit based on an access control rule set comprising a plurality of access control rules defined on a plurality of overlapping address ranges.

16. The method of claim 15, wherein a first access control rule defined on a first address range of the plurality of overlapping address ranges is interpreted as overriding a second access control rule defined on a second address range of the plurality of overlapping address ranges.

17. The method of claim 11, wherein the controlling further comprises translating a virtual address to a physical address, the physical address referencing a memory location on the target device.

18. The method of claim 11, wherein receiving the message comprising the access control data item is performed within a boot sequence of the SoC.

19. The method of claim 11, wherein the access control data item comprises an address translation rule.

* * * * *